United States Patent
Bidard-Michelot et al.

(10) Patent No.: US 12,529,045 B2
(45) Date of Patent: Jan. 20, 2026

(54) METHOD OF PRODUCING PROTEINS USING A TRICHODERMA FUNGUS STRAIN IN WHICH THE CEL1A GENE IS INVALIDATED

(71) Applicant: IFP Energies Nouvelles, Rueil Malmaison (FR)

(72) Inventors: Frédérique Bidard-Michelot, Rueil Malmaison (FR); Etienne Jourdier, Rueil Malmaison (FR); Vincent Grandperret, Rueil Malmaison (FR); Christa Ivanova, Rueil Malmaison (FR); Sabine Prigent, Rueil Malmaison (FR); Céline Cohen, Rueil Malmaison (FR); Antoine Margeot, Rueil Malmaison (FR)

(73) Assignee: IFP Energies Nouvelles, Rueil Malmaison (FR)

( * ) Notice: Subject to any disclaimer, the term of this patent is extended or adjusted under 35 U.S.C. 154(b) by 483 days.

(21) Appl. No.: 18/011,604

(22) PCT Filed: Jun. 21, 2021

(86) PCT No.: PCT/FR2021/051117
§ 371 (c)(1),
(2) Date: Dec. 20, 2022

(87) PCT Pub. No.: WO2021/260310
PCT Pub. Date: Dec. 30, 2021

(65) Prior Publication Data
US 2023/0303991 A1    Sep. 28, 2023

(30) Foreign Application Priority Data

Jun. 22, 2020 (FR) .................... 20 06495

(51) Int. Cl.
| | |
|---|---|
| *C12N 9/42* | (2006.01) |
| *C12N 1/14* | (2006.01) |
| *C12P 7/06* | (2006.01) |
| *C12P 21/00* | (2006.01) |
| *C12R 1/885* | (2006.01) |

(52) U.S. Cl.
CPC ........... *C12N 9/2437* (2013.01); *C12N 1/145* (2021.05); *C12P 7/065* (2013.01); *C12P 21/00* (2013.01); *C12Y 302/01004* (2013.01); *C12R 2001/885* (2021.05)

(58) Field of Classification Search
CPC .. C12N 1/145; C12Y 302/01021; C12P 19/14
See application file for complete search history.

(56) References Cited

U.S. PATENT DOCUMENTS

2023/0303991 A1* 9/2023 Bidard-Michelot ..... C12N 1/38

FOREIGN PATENT DOCUMENTS

| EP | 1690944 A1 | 8/2006 |
| JP | 2014-150745 A | 8/2014 |

OTHER PUBLICATIONS

Peterson et al., "Trichoderma reesei RUT-C30-thirty years of strain improvement," Microbiology, 158: 58-68 (2012).
Shida et al., "The impact of a single-nucleotide mutation of bgl2 on cellulase induction in a Trichoderma reesei mutant," Biotechnology for Biofuels, 8: 230 (2015).
Xu et al., "Intracellular Beta-Glucosidases CEL1a and CEL1b are Essential for Cellulase Induction on Lactose in Trichoderma reesei," Eukaryotic Cell, 13 (8): 1001-1013 (2014).
Zhou et al., "Differential Involvement of Beta-Glucosidases from Hypocrea jecorina in Rapid Induction of Cellulase Genes by Cellulose and Cellobiose," Eukaryotic Cell, 11 (11): 1371-1381 (2012).
Guo et al., "Improvements in Glucose Sensitivity and Stability of Trichoderma reesei beta-Glucosidase Using Site-Directed Mutagenesis," PLoS One, 11 (1): e0147301 (2016).
International Search Report issued in corresponding International Patent Application No. PCT/FR2021/051117 dated Oct. 15, 2021.
Jourdier et al., "Cellulase activity mapping of Trichoderma reesei cultivated in sugar mixtures under fed-batch conditions," Biotechnology for Biofuels, 6:79 (2013).

* cited by examiner

*Primary Examiner* — Tekchand Saidha
(74) *Attorney, Agent, or Firm* — Morgan, Lewis & Bockius LLP

(57) ABSTRACT

The invention relates to the various uses of a fungus strain which belongs to the *Trichoderma* genus and in which the cel1a gene has been knocked out. The invention relates in particular to a method of producing proteins by a fungus strain which belongs to the *Trichoderma* genus and in which the cel1a gene has been knocked out, comprising at least two steps:
 a first step of growth in a batch phase in the presence of at least one carbon growth substrate, and
 a second step of producing proteins in a fed-batch phase in the presence of a composition comprising at least lactose and a second sugar, the lactose content in the composition representing approximately between 0 and 30% by weight of the total sugar content of the composition, in particular between 5 and 30%.

17 Claims, 2 Drawing Sheets

Specification includes a Sequence Listing.

[Fig. 1]
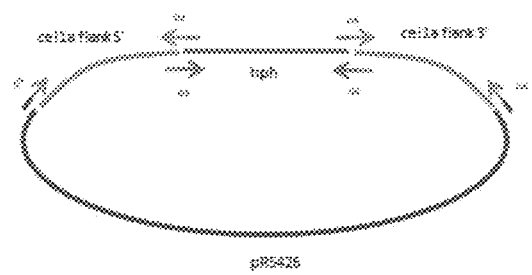
[Fig. 2]
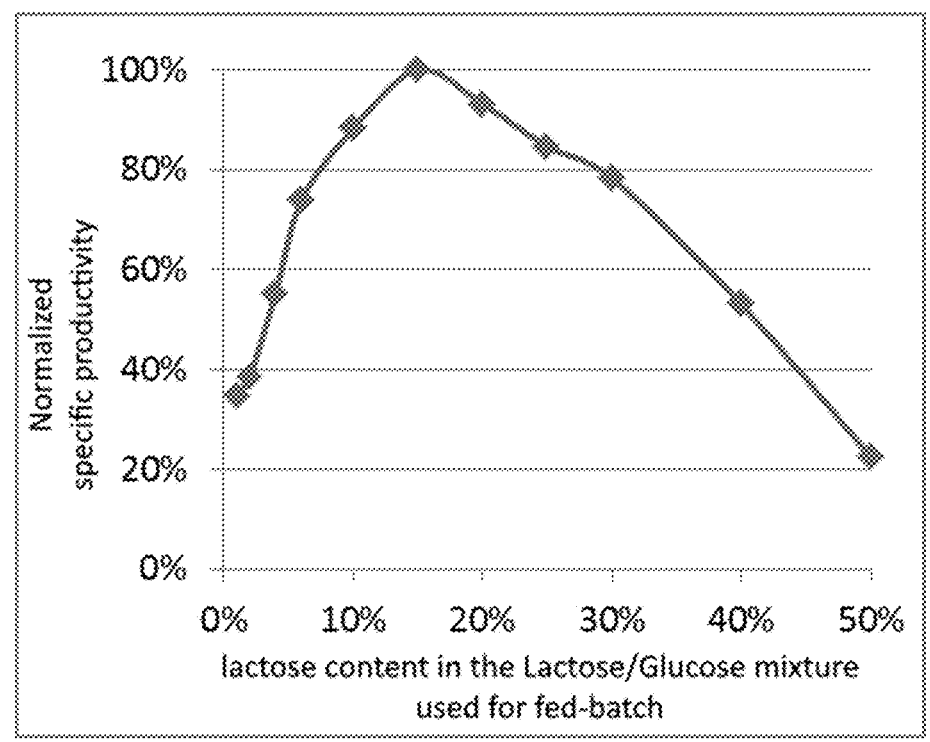

[Fig. 3]
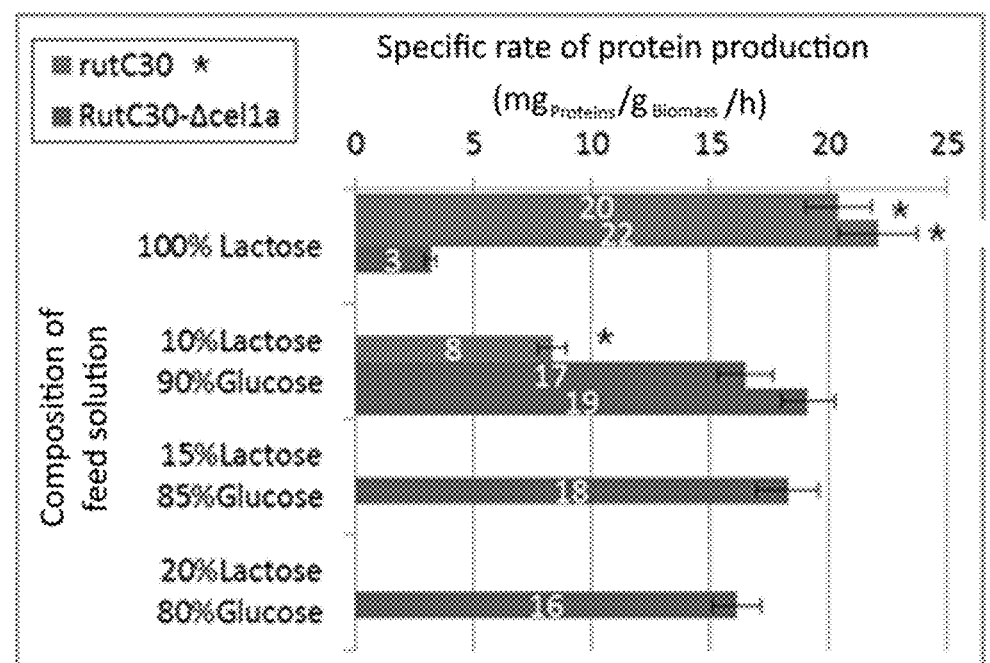

METHOD OF PRODUCING PROTEINS USING A TRICHODERMA FUNGUS STRAIN IN WHICH THE CEL1A GENE IS INVALIDATED

SEQUENCE LISTING SUBMISSION VIA EFS-WEB

A computer readable text file, entitled "SequenceListing.txt" created on Dec. 19, 2022 with a file size of 22,190 bytes contains the sequence listing for this application and is hereby incorporated by reference in its entirety.

This invention relates to a method of producing proteins by (i) a strain of fungus belonging to the *Trichoderma* genus and in which the cel1a gene has been knocked out, and (ii) an optimized inducer composition.

CONTEXT OF THE INVENTION

Strains of fungus belonging to the *Trichoderma* genus, in particular *Trichoderma reesei*, today are mainly used for the production of enzymes. These enzymes, for example cellulases, are in fact used to hydrolyze cellulosic or lignocellulosic biomass into simple sugars. The enzymes produced by filamentous fungi are therefore useful in production chains for second-generation biofuels or even biobased products derived from sugars originating from (ligno)cellulosic biomass.

In order to improve the production of second-generation biofuels or biobased products, it has therefore been proposed to improve the production of cellulases.

For example, patent EP 448 430 B1 describes an optimized industrial production of cellulases by *Trichoderma reesei*. This production is carried out according to a fed-batch protocol (feeding without extraction) using a feed solution containing lactose as the sugar inducing the production of proteins. This fermentation method comprises two steps: a first step of fungus growth in the presence of an excess of carbon source and a second step of enzyme production due to the addition of an inducer into the medium with an optimized flow rate (fed-batch mode). These steps are carried out in a liquid medium in bioreactors while stirring and in the presence of oxygen because the fungus is strictly aerobic. Another example of an optimized method of producing cellulases is described in patent EP 2 744 899 B1.

Traditionally, particularly in the laboratory, the feed solution used during the second step contains only lactose. However, industrially, lactose is too expensive to use alone in the feed solution. Various solutions have thus been considered for reducing the amount of lactose to be used.

For example, Jourdier et al. have shown that it is possible to replace part of the lactose with other less expensive sugars such as glucose and/or purified xylose (see Jourdier et al. Biotechnology for Biofuels 2013, 6:79). In this study, the authors analyzed the impact of glucose and/or xylose on the secretion of enzymes by a hyperproducing strain of *Trichoderma reesei* (strain CL847). This study thus allows concluding that in industrial strain CL847, which comes from the hyperproducing model strain RutC30, the induction capacity is positively correlated with the lactose content present in the feed solution: the higher the lactose content, the better the induction.

International application PCT/FR2011/000350 also describes a method of producing cellulolytic and/or hemicellulolytic enzymes, using, during the production phase, a composition comprising from 40 to 65% by weight of glucose, from 21 to 25% by weight of lactose, and from 10 to 39% by weight of xylose, in combination with a *Trichoderma reesei* fungus inactivated for catabolite repression by glucose.

Modified strains of *Trichoderma reesei*, in which regulatory elements of the promoter sequences of the xyn1 and xyn2 xylanase genes have been inserted into the cellulase promoters have also been described in international application PCT/FR2016/050950. Thus, in said modified strains, the genes are inducible by their own inducing substrates, such as lactose, cellobiose, or cellulose, but also by xylanase-inducing substrates such as xylan, xylose, etc.

Fermentation methods and strains useful for improving the production of cellulolytic enzymes by filamentous fungi, and by doing so, of biobased products but also second-generation biofuels, are therefore already described in the prior art.

Nevertheless, there is still a need for new methods for the production of proteins, in particular cellulolytic enzymes, which are as efficient as possible, in particular allowing sufficient production while using as little lactose as possible in order to reduce costs.

Strains of *Trichoderma reesei* in which the cel1a gene has been knocked out have been described in the prior art. For example, the teams of Zhou et al. (Differential Involvement of β-Glucosidases from *Hypocrea jecorina* in Rapid Induction of Cellulase Genes by Cellulose and Cellobiose. *Eukaryotic Cell* 11 (11) 1371-1381 (2012)) and Xu et al. (Intracellular 13-Glucosidases CEL1a and CEL1 b Are Essential for Cellulase Induction on Lactose in *Trichoderma reesei*, *Eukaryotic Cell* 13 (8), pp. 1001-1013 (2014)) have described the knockout of the cel1a gene in the parent strain *Trichoderma reesei* TU-6 (ATCC MYA-256). The team of Xu et al. concluded in particular that the CEL1a protein is an intracellular β-glucosidase which is essential in induction by lactose.

In contrast, the present invention is based on the unexpected results of the inventors which demonstrated that it was possible to induce the production of proteins using an inducing composition containing less lactose or even none at all, namely a composition containing 0% by weight of lactose relative to the total sugar content in said composition, or of lactose at a content greater than 0% by weight and at most 30% by weight of the total sugar content in said composition, and in particular being between 5% by weight and 30% by weight of the total sugar content in said composition, using a strain of *Trichoderma* fungus, in particular *Trichoderma reesei*, in which the genome has been modified so as to knock out the cel1a gene.

The invention thus presents several embodiments concerning the possible lactose content of the inducing composition used during the second step:
  either 0% by weight of lactose, the inducing composition comprising at least one other sugar (also called "second sugar" in the text); here there is no longer any use of lactose at all;
  or lactose at a content of more than 0% up to a content strictly less than 5% by weight of the total sugar content in said composition;
  or lactose at a content greater than or equal to 5% by weight up to a content less than or equal to 30% by weight of the total sugar content in said composition.

The inventors have shown in particular that knockout of the cel1a gene in a strain of *Trichoderma reesei* made it possible to divide by 10 the amount of lactose used in the production phase, or even to eliminate it completely, while maintaining an equivalent specific productivity compared to a reference strain.

The inventors have shown in particular that the strain in which cel1a has been knocked out, although it does not produce proteins when fed pure glucose or pure lactose, produces proteins correctly when fed glucose/lactose mixtures, with an advantageous range of lactose contents in the feed solution, comprised between 5% and 30% by weight of total sugars, in particular for contents comprised between 10% and 20% by weight.

More particularly, the inventors have shown that feed solutions having lactose contents comprising between 10 and 15% by weight of total sugars give an equivalent induction as the pure lactose in the parent strain (in which the cel1a gene was not knocked out), with specific rates of protein production that are on the order of $20\pm2$ $mg_{proteins}/g_{biomass}/h$.

BRIEF DESCRIPTION OF THE INVENTION

In general, the invention is based on the use, during the fed-batch phase of the protein production step, of a composition comprising a second sugar, and optionally at least lactose, the lactose content in said composition being equal to 0% by weight of the total sugar content in said composition, or being greater than 0% by weight and at most 30% by weight of the total sugar content in said composition.

The invention thus relates to a method of producing proteins by a strain of fungus belonging to the *Trichoderma* genus in which the cel1a gene has been knocked out, comprising at least two steps:
  a first step of growth in a batch phase in the presence of at least one carbon growth substrate, and
  a second step of producing proteins in a fed-batch phase in the presence of a composition comprising at least lactose and a second sugar, the lactose content in said composition representing approximately between 0 and 30% by weight of the total sugar content in said composition.

The invention thus relates to a method of producing proteins by a strain of fungus belonging to the *Trichoderma* genus in which the cel1a gene has been knocked out, comprising at least two steps:
  a first step of growth in a batch phase in the presence of at least one carbon growth substrate, and
  a second step of producing proteins in a fed-batch phase in the presence of a composition comprising at least lactose and a second sugar, the lactose content in said composition representing approximately between 5 and 30% by weight of the total sugar content in said composition.

The invention also relates to the use of a composition comprising at least lactose and a second sugar, the lactose content in said composition representing approximately between 0 and 30%, in particular between 5 and 30%, by weight of the total sugar content in said composition for the production of proteins of interest by using a strain of fungus belonging to the *Trichoderma* genus in which the cel1a gene has been knocked out.

The invention also relates to a method of producing sugars from cellulosic or lignocellulosic substrates, comprising a step of producing cellulolytic enzymes by a strain of fungus belonging to the *Trichoderma* genus in which the cel1a gene has been knocked out, in the presence of a composition comprising at least lactose and a second sugar, the lactose content in said composition representing approximately between 0 and 30%, in particular between 5 and 30%, by weight of the total sugar content in said composition. In this aspect, the invention therefore relates to the use of a strain of fungus belonging to the *Trichoderma* genus in which the cel1a gene has been knocked out, for the hydrolysis of cellulose or lignocellulose into sugar.

The invention also relates to a method of producing biobased products from cellulosic or lignocellulosic substrates, comprising a step of producing cellulolytic enzymes by a strain of fungus belonging to the *Trichoderma* genus in which the cel1a gene has been knocked out, in the presence of a composition comprising at least lactose and a second sugar, the lactose content in said composition representing approximately between 0 and 30%, in particular 5 and 30%, by weight of the total sugar content in said composition. In this aspect, the invention therefore relates to the use of a strain of fungus belonging to the *Trichoderma* genus in which the cel1a gene has been knocked out, for the production of biobased products from cellulosic or lignocellulosic substrates.

The invention also relates to a method of producing a biofuel/alcohol from cellulosic or lignocellulosic substrates, comprising a step of producing cellulolytic enzymes by a strain of fungus belonging to the *Trichoderma* genus in which the cel1a gene has been knocked out, in the presence of a composition comprising at least lactose and a second sugar, the lactose content in said composition representing approximately between 0 and 30%, in particular between 5 and 30%, by weight of the total sugar content in said composition. In this aspect, the invention therefore relates to the use of a strain of fungus belonging to the *Trichoderma* genus in which the cel1a gene has been knocked out, for the production of biofuel/alcohol from cellulosic or lignocellulosic substrates.

The invention lastly relates to a strain of fungus belonging to the species *Trichoderma reesei*, said strain being derived from the strain deposited under ATCC reference 56765 and said strain comprising a knockout of the cel1a gene. The invention also relates more generally to a strain which comes from the Rut-C30 strain, and said strain comprising a knockout of the cel1a gene.

DISCLOSURE OF THE INVENTION

In a first aspect, the invention thus relates to a method of producing proteins by a strain of fungus belonging to the *Trichoderma* genus in which the cel1a gene has been knocked out, comprising at least two steps:
  a first step of growth in a batch phase in the presence of at least one carbon growth substrate, and
  a second step of producing proteins in a fed-batch phase in the presence of a composition comprising at least lactose and a second sugar, the lactose content in said composition representing approximately between 0 and 30% or between 5 and 30% by weight of the total sugar content in said composition.

In other words, in a first aspect, the invention relates to a method of producing proteins by a strain of fungus belonging to the *Trichoderma* genus in which the cel1a gene has been knocked out, comprising at least two steps:
  a first step of growth in a batch phase in the presence of at least one carbon growth substrate, and
  a second step of producing proteins in a fed-batch phase in the presence of a composition comprising a second sugar, and optionally at least lactose, the lactose content in said composition being equal to 0% by weight of the total sugar content in said composition, or being greater than 0% by weight and at most 30% by weight of the total sugar content in said composition.

According to the invention, the expression "approximately between 0 and 30% by weight of the total sugar content in said composition" means a lactose content that is greater than or equal to 0% and strictly less than 5% and/or a content of between 5 and 30% by weight of the total sugar content in said composition. This also means a lactose content greater than or equal to 0.01% (preferably 0.1% or 1%) and strictly less than 5% and/or a content of between 5 and 30% by weight of the total sugar content in said composition.

The composition used in the fed-batch step according to the invention may thus:
be lactose-free, or
contain lactose, but at a content of between 0.01% and 30% by weight of the total sugar content in said composition.

The composition used in the fed-batch step according to the invention may thus:
be lactose-free, or
contain lactose, but at a content of between 0.1% and 30% by weight of the total sugar content in said composition.

The composition used in the fed-batch step according to the invention may thus:
be lactose-free, or
contain lactose, but at a content of between 1% and 30% by weight of the total sugar content in said composition.

The composition used in the fed-batch step according to the invention may thus comprise lactose and another (second) sugar or else may comprise at least one sugar other than lactose, preferably at least two sugars.

In other words, in a first aspect, the invention relates to a method of producing proteins by a strain of fungus belonging to the *Trichoderma* genus in which the cel1a gene has been knocked out, comprising at least two steps:
a first step of growth in a batch phase in the presence of at least one carbon growth substrate, and
a second step of producing proteins in a fed-batch phase in the presence of a composition:
  not comprising lactose and comprising at least one other sugar, or
  comprising at least lactose and a second sugar, the lactose content in said composition representing between 0.01 and 30% by weight of the total sugar content in said composition.

According to one embodiment, the composition used in the fed-batch step according to the invention comprises:
0.00% lactose; or
a lactose content strictly greater than 0.00% and strictly less than 5.00% by weight of the total sugar content in said composition, or
a lactose content greater than or equal to 5.00% and less than or equal to 30.00% by weight of the total sugar content in said composition.

The expression "strictly greater than 0.00%" means a value of at least 0.01%, in particular at least 0.1%, and preferably at least 1%, and the expression "strictly less than 5.00%" means values up to 4.99%.

According to a preferred embodiment, the lactose content in the composition used during the fed-batch step is between more than 0% and 5% by weight of the total sugar content in said composition, or between more than 5% and less than 10% by weight of the total sugar content in said composition, or from 10% weight to at most 20% by weight of the total sugar content in said composition.

According to the invention, the cel1a gene corresponds to the gene represented by SEQ ID No: 1 or a gene having at least 80% identity with SEQ ID No: 1. The cel1a gene is also named TRIREDRAFT_120749 in the *Trichoderma Reesei* reference genome (https://www.uniprot.org/uniprot/g0rd31). This gene encodes a CEL1a protein belonging to glycoside hydrolase family 1. More specifically, CEL1a is an intracellular β-glucosidase, also called BGL2 or BGLII (M. Saloheimo, J. Kuja-Panula, E. Ylösmaki, et al. (2002) *Enzymatic Properties and Intracellular Localization of the Novel Trichoderma reesei β-Glucosidase BGLII (Cel1A)*. *Applied and Environmental Microbiology*, 68 (9) 4546-4553). The CEL1a protein is represented by SEQ ID No: 2.

The cel1a gene is the reference gene in *Trichoderma Reesei*. A gene having at least 80% identity thus represents a variant of this gene or an ortholog gene in another *Trichoderma* species. According to the invention, the expression "at least 80% identity with SEQ ID No: 1" means all values between 80% and 100%, in particular the values 80%, 81%, 82%, 83%, 84%, 85%, 86%, 87%, 88%, 89%, 90%, 91%, 92%, 93%, 94%, 95%, 96%, 97%, 98%, 99%, and 100%, preferably at least 90%, at least 95%, even more preferably at least 98%, at least 99%. A person skilled in the art knows how to calculate the identity percentage between two sequences. For example, according to the invention, the identity percentage of a given sequence compared to SEQ ID No: 1 is understood to mean the identity percentage over the total length of the sequences. The percentage thus corresponds to the number of identical nucleotides (residues where necessary) between this given sequence and SEQ ID NO: 1, divided by the number of nucleotides (residues where necessary) in the longest of the two sequences.

When the CEL1A protein is encoded by an ortholog or a variant of the cel1 gene, said protein can be represented by a protein having at least 80% identity with SEQ ID No: 2, in particular at least 90%, at least 95%, preferably at least 98% or at least 99%.

According to a preferred method of production of the invention, the fungus belongs to the species *Trichoderma reesei*. According to this method of production, the cel1a gene is preferably represented by SEQ ID No: 1 or by a sequence having at least 98% identity with SEQ ID No: 1. Very preferably, the cel1a gene is represented by SEQ ID No: 1. The parent strain of *Trichoderma reesei* may in particular be the QM6A strain (deposited under ATCC number 13631), or a strain from the natural isolate of QM6A (in particular obtained by random or directed mutagenesis), such as strain Rut-C30 (deposited under ATCC number 56765), the strain deposited under CNCM number 1-5221 (deposited on Aug. 3, 2017 with the CNCM, *Collection Nationale de Cultures de Microorganismes* of the Institut Pasteur, located at 25 rue du Docteur Roux, F-75724 PARIS Cedex 15), strain NG14 (deposited under ATCC number 56767), or strain QM9414 (deposited under ATCC number 26921).

According to the invention, the proteins are all proteins that can be produced by a fungus, naturally or by genetic modification (for example after transformation using an appropriate vector).

Advantageously, the proteins of interest according to the invention are enzymes, in particular cellulolytic enzymes such as cellulases or hemicellulases. Preferably, the enzymes are cellulases. According to the invention, the term "cellulases" more particularly means enzymes belonging to the glycoside hydrolase family, for example selected among endoglucanases, exoglucanases, and glucosidases. The glycoside hydrolases are grouped under the "EC 3.2.1." nomenclature. The term "cellulase" refers more particularly to an enzyme adapted for the hydrolysis of cellulose and enabling the microorganisms (such as *Trichoderma* reesei) which produce them to use cellulose as a source of carbon, by hydrolyzing this polymer into simple sugars (glucose). The production of cellulases by a strain according to the invention, in particular *Trichoderma reesei*, can be determined by any usual technique of those skilled in the art, or by the techniques described in patents EP 448 430 B1 or EP 2 744 899 B1.

The expression "the lactose content representing approximately between 0 and 30% by weight of the total sugar content" means that during the fed-batch step, between 70 and 100% by weight of the sugar(s) provided by said composition are one or more sugars other than lactose. The expression "the lactose content representing approximately between 5 and 30% by weight of the total sugar content" means that during the fed-batch step, between 70 and 95% by weight of the sugar(s) provided by said composition are one or more sugars other than lactose. The total sugar content thus corresponds to 100% by weight of the sugar content of the composition.

According to one embodiment, the method according to the invention is carried out in a stirred and aerated bioreactor. More particularly, the stirring speed is controlled, in particular to maintain a concentration of dissolved oxygen that is greater than 40% of the concentration at saturation. For example, in the laboratory, the stirring speed is generally controlled to be between 400 and 1200 rpm.

According to one embodiment, in said method the temperature is controlled during the first and the second step, in particular to be between 20 and 35° C. More particularly, the temperature is controlled to be 27° C. during the first step and 25° C. during the second step.

According to one embodiment, in said method, the pH is controlled. More specifically, the pH is controlled to be 4.0, in particular by automatic addition of 5N ammonia solution.

According to one embodiment, the first phase takes place until the carbon growth substrate is exhausted. This first step generally lasts approximately between 18 and 48 hours, in particular 24 to 36 hours.

According to one embodiment, the second phase takes place for approximately 70 to 240 hours, in particular 70 hours.

According to a preferred embodiment, in said method, the first phase lasts between 18 and 48 hours, in particular 24 to 36 hours, and the second phase takes place for approximately 70 to 240 hours, in particular 70 hours.

According to one embodiment, the method according to the invention makes it possible to obtain a productivity of between 14 and 25 $mg_{proteins}/g_{biomass}/h$, in particular between 14 and 23 $mg_{proteins}/g_{biomass}/h$. According to one embodiment, the method according to the invention makes it possible to obtain a productivity of between 15 and 20 $mg_{proteins}/g_{biomass}/h$, in particular between 16 and 19 $mg_{proteins}/g_{biomass}/h$. The induction capacity of a sugar solution on a strain is assessed by measuring the specific rate of protein production (also called "specific productivity"), expressed in $mg_{proteins}/g_{biomass}/h$, during a culture with the sugar solution being fed at an optimized flow rate. It is known to those skilled in the art that the proteins produced by *Trichoderma reesei* are mainly enzymes, including cellulases. A correlation between total secreted proteins and cellulases can be made because in *Trichoderma reesei*, the main exoglucanases (CBHI, CBHII) and endoglucanases (EGI, EGII) can represent up to 90% of the total amount of secreted proteins (see for example Markov, A. V., Gusakov, A. V., Kondratyeva, E. G., Okunev, O. N., Bekkarevich, A. O., and Sinitsyn, A. P. (2005). New Effective Method for Analysis of the Component Composition of Enzyme Complexes from *Trichoderma reesei*. Biochemistry (Moscow) 70, 657-663). Thus, the enzyme or cellulose productivity is therefore equivalent to the protein productivity.

The expression "a strain of fungus belonging to the *Trichoderma* genus in which the cel1a gene has been knocked out" means that the genome of the strains used in the invention has been modified so that the cel1a gene is no longer expressed (or the gene variant or the ortholog gene if applicable). Thus, in the strains used in the invention, the CEL1a protein is not produced or else a non-functional CEL1a is produced (i.e. the protein is no longer biologically active). In other words, the genome of the strain according to the invention is modified (or has been modified) so that the CEL1a protein is not synthesized or is synthesized in a non-functional form. Preferably, the CEL1a protein is not produced/synthesized. Knockout of a gene is well known to those skilled in the art. According to one embodiment, the cel1a gene has been knocked out of the strain by mutagenesis or by homologous recombination, in particular using a knockout cassette as represented by SEQ ID NO: 3.

The invention thus relates to the use of a variant strain of *Trichoderma* fungus, in which the cel1a gene has been knocked out. According to the invention, the term "variant strain" is understood to mean a strain that is genetically modified in comparison to a parent strain. According to the invention, the term "parent strain" thus means a strain from which the variant strain is derived or descended, and in which the cel1a gene has not been knocked out. The strain according to the invention thus corresponds to a variant strain derived from a parent strain, said variant strain comprising at least one genetic modification corresponding to knockout of the cel1a gene in comparison to the parent strain.

During the growth step in "batch" mode, it is necessary to provide a rapidly assimilable source of carbon for the growth of the *Trichoderma* fungus. According to the invention, the "carbon growth substrate" is preferably selected among lactose, glucose, xylose, the liquid residues obtained after ethanol fermentation (optionally obtained after ethanol fermentation then distillation) of monomeric sugars of enzymatic hydrolysates of cellulosic biomass, a crude extract of water-soluble pentoses originating from pretreatment of a cellulosic biomass, an enzymatic hydrolysate of lignocellulose (meaning before fermentation), and/or a hydrolysate of starchy biomass. Preferably, the substrate is selected among glucose, xylose, the liquid residues obtained after ethanol fermentation (optionally obtained after ethanol fermentation then distillation) of monomeric sugars of enzymatic hydrolysates of cellulosic biomass, a crude extract of water-soluble pentoses originating from pretreatment of cellulosic biomass, an enzymatic hydrolysate of lignocellulose (meaning before fermentation), and/or a hydrolysate of starchy biomass. Very preferably, the substrate is glucose.

According to the invention, the concentration of carbon growth substrate is in particular between 10 and 80 g/L, in particular between 15 and 40 g/L.

The composition used in the second step of protein production of the method according to the invention may also be called "feed solution" or "sugar feed solution". According to the invention, and in a first embodiment, this composition comprises at least two sugars: lactose and another sugar. In one aspect of the invention, this composition comprises at least three different sugars: lactose and two other sugars. According to the invention and in another embodiment, said composition used in the second step of protein production of the method comprises at least one sugar that is not lactose, preferably at least two sugars that are not lactose.

Lactose is an inducing substrate, i.e. it enables the expression of proteins, in particular cellulases, in the culture medium. Preferably, in said composition, said second sugar is not an inducing sugar but is nevertheless a carbon substrate.

According to the invention, the concentration of sugars in the composition used during the fed-batch step is in particular between 200 and 600 g/L, in particular between 200 and 500 g/L or between 250 g/L and 500 g/L.

More particularly, the second sugar (or the "at least one sugar that is not lactose") is supplied via a solution of glucose and/or xylose (preferably purified), a hydrolysate of starchy biomass, a enzymatic hydrolysate of lignocellulosic biomass, a crude extract of water-soluble pentoses originating from pretreatment of a cellulosic biomass, and/or the liquid residues obtained after ethanol fermentation (optionally obtained after ethanol fermentation then distillation) of the monomeric sugars of the enzymatic hydrolysates of cellulosic biomass. The invention thus makes it possible to use industrial sugar solutions, provided that they may possibly be supplemented with lactose, to induce protein production.

According to one embodiment, as these solutions mainly contain glucose and xylose, two sugars which do not induce protein production in *Trichoderma reesei*, it is necessary to supplement them with lactose so that the obtained mixture provides the correct level of induction. According to the invention, the composition comprising at least lactose and a second sugar can thus also be called an inducing composition. According to one particular embodiment, the feed composition/solution used in the fed-batch step thus corresponds to a solution of glucose and/or xylose (preferably purified), a hydrolysate of starchy biomass, an enzymatic hydrolysate of lignocellulosic biomass, a crude extract of water-soluble pentoses originating from pretreatment of a cellulosic biomass, and/or the liquid residues obtained after ethanol fermentation (optionally obtained after ethanol fermentation then distillation) of the monomeric sugars of the enzymatic hydrolysates of cellulosic biomass, into which lactose is added, so that the lactose content in said composition represents approximately between 0 and 30%, in particular 5 and 30%, by weight of the total sugar content. In other words, according to one embodiment, said second sugar or said "at least one sugar that is not lactose" is selected among glucose, xylose, liquid residues obtained after ethanol fermentation (optionally obtained after ethanol fermentation then distillation) of monomeric sugars of the enzymatic hydrolysates of cellulosic biomass, a crude extract of water-soluble pentoses originating from pretreatment of a cellulosic biomass, an enzymatic hydrolysate of lignocellulose, and/or a hydrolysate of starchy biomass, preferably glucose, xylose, and/or a crude extract of water-soluble pentoses.

Typically, a hydrolysate of starchy biomass mainly contains glucose.

Typically, an enzymatic hydrolysate of lignocellulosic biomass mainly contains glucose and xylose.

Typically, a crude extract of water-soluble pentoses originating from pretreatment of cellulosic biomass mainly contains xylose. The cellulosic biomass used may for example be wheat straw, corn stover, corn cobs, sugar cane bagasse, miscanthus, poplar, birch, and any other product or co-product of the agricultural and forestry industries. Preferably, the crude extract of water-soluble pentoses is prepared by pretreating wheat straw or corn stover. A process of pretreatment by steam explosion is described for example in application WO 2019/120994 A1. A process of pretreatment and extraction which makes it possible to prepare a crude extract of water-soluble pentoses is described for example in patent application EP 3 587 583 A1.

Typically, the liquid residues obtained after ethanol fermentation (optionally obtained after ethanol fermentation then distillation) of the monomeric sugars of the enzymatic hydrolysates of cellulosic biomass mainly contain non-fermentable sugars (arabinose, mannose, galactose) and residues of fermentable sugars (glucose and xylose).

More particularly, according to a preferred embodiment, the second sugar is selected among glucose and/or xylose, preferably glucose. According to one embodiment, said composition comprises for the sugars only lactose and glucose OR only lactose and xylose OR only lactose, glucose, and xylose. According to one embodiment, said composition used during the fed-batch production step comprises glucose, lactose, and a crude extract of water-soluble pentoses (in particular originating from pretreatment of a cellulosic biomass such as corn stover or wheat straw).

According to one embodiment, said composition used during the fed-batch production step comprises glucose, a crude extract of water-soluble pentoses (in particular originating from pretreatment of a cellulosic biomass such as corn stover or wheat straw), and is lactose-free.

According to the invention, the percentages of lactose, glucose and/or xylose, and/or crude extract of water-soluble pentoses in the composition are calculated relative to the total sugar content by weight in said composition. Typically, the total sugar content is that used during fed-batch mode. The content of each sugar in the composition/solution is for example measured by high performance liquid phase chromatography (HPLC), optionally after concentration by evaporation. Then powdered purified lactose or glucose is dissolved, or a concentrated glucose solution is mixed. The new sugar content for each sugar is then remeasured by HPLC in the final mixture.

According to one embodiment, during the fed-batch step the composition is supplied/provided continuously, in limited flow. This means that the concentration of sugars in the culture medium is controlled so as to maintain a residual concentration of sugars in the culture medium that is close to zero. Preferably, the concentration of sugar in the culture medium is less than 1 g/L during this phase, in particular less than 0.5 g/L, more particularly less than 0.1 g/L. This promotes the induction and production of proteins.

Given that the *Trichoderma* fungus, in particular *Trichoderma reesei*, is capable of consuming all sugars present in said inducing composition, calculation of the optimized flow rate of said composition (feed solution for fed-batch mode) must be done not in relation to the lactose concentration in the solution but by adding up the concentration of all sugars present in the solution.

According to one embodiment, it is the mass flow rate (in $g_{sugars}/h$) which is optimized and not the total concentration of sugars in the feed solution (in $g_{sugars}/L$). The volume flow rate of the feed solution (in L/h) can thus be adapted to provide the correct mass flow rate of sugars regardless of the concentration of sugars in the feed solution. According to one embodiment, said composition in the production step (fed-batch) is supplied at a flow rate of between 0.8 and 8 $mL_{solution}/L_{medium}/h$, preferably between 1 and 3 $mL_{solution}/L_{medium}/h$. The term "$mL_{solution}$" here represents the volume of said composition (feed solution for fed-batch mode) and the term "$L_{medium}$" here represents the volume of the bioreactor/fermenter.

According to the invention, the expression "approximately between 0 and 30% by weight of the total sugar content in said composition" or "approximately between 5 and 30% by weight of the total sugar content in said composition" represents all values between 0 and 30, i.e. 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, and 30. More specifically, the term "approximately" means that values very slightly below 5 (for example between 4.5 and 5) are included in the 5-30% range. This also means that values very slightly above 30 (for example between 30 and 30.5) are included in the 5-30% range.

According to one particular embodiment, in the method of producing proteins according to the invention, said composition comprises, in relation to the total sugar content in said composition:
approximately between 70-95% by weight of glucose and/or xylose, and
approximately between 5-30% by weight of lactose.

The expression "approximately between 70-95%" means that values very slightly below 70 (for example between 69.5 and 70) are included in the 70-95% range. This also means that values very slightly above 95 (for example between 95 and 95.5) are included in the 70-95% range.

According to one even more particular embodiment, in the method of producing proteins according to the invention, said composition comprises, in relation to the total sugar content in said composition:
between 70-95% by weight of glucose, and
between 5-30% by weight of lactose.

Even more preferably, in said method of producing proteins according to the invention, the lactose content in said composition represents approximately between 10 and 20% by weight, in particular between 10 and 20% by weight, of the total sugar content in said composition.

The expression "approximately between 10 and 20%" means that values very slightly below 10 (for example between 9.5 and 10) are included in the 10-20% range. This also means that values very slightly above 20 (for example between 20 and 20.5) are included in the 10-20% range.

According to one even more particular embodiment, in the method of producing proteins according to the invention, said composition comprises:
approximately between 80-90% by weight of glucose and/or xylose, and
approximately between 10-20% by weight of lactose, and more particularly
approximately between 80-90% by weight of glucose, and
approximately between 10-20% by weight of lactose.

Even more preferably, in said method of producing proteins according to the invention, the lactose content in said composition represents approximately between 10 and 15% by weight, in particular between 10 and 15% by weight, of the total sugar content in said composition.

The expression "approximately between 10 and 15%" means that values very slightly below 10 (for example between 9.5 and 10) are included in the 10-15% range. This also means that values very slightly above 15 (for example between 15 and 15.5) are included in the 10-15% range.

According to one even more particular embodiment, in the method of producing proteins according to the invention, said composition comprises:
approximately between 85-90% by weight of glucose and/or xylose, and
approximately between 10-15% by weight of lactose, and more particularly
approximately between 85-90% by weight of glucose, and
approximately between 10-15% by weight of lactose.

According to one even more particular embodiment, in the method of producing proteins according to the invention, said composition comprises:
approximately between 90-95% by weight of crude extract of water-soluble pentoses and glucose, and
between 5-10% of lactose.

According to one even more specific embodiment, in the method of producing proteins according to the invention, the sugar content in said composition consists of 100% crude extract of water-soluble pentoses and glucose.

According to one embodiment, the substrates are sterilized. Thus, according to one embodiment, the carbon growth substrate is introduced into the bioreactor before sterilization. According to another embodiment, the carbon growth substrate is sterilized separately and then introduced into the bioreactor after sterilization. In either of these alternatives, according to one embodiment, the sugar composition used during the fed-batch step is sterilized separately and then introduced into the bioreactor after sterilization.

In a second aspect, the invention relates to the use of a composition comprising at least lactose and a second sugar, the lactose content in said composition representing approximately between 0% and 30% or between 5% and 30% by weight of the total sugar content in said composition, for the production of proteins of interest by a strain of fungus belonging to the *Trichoderma* genus in which the cel1a gene has been knocked out.

In a second aspect, the invention relates to the use of a composition comprising at least lactose and a second sugar, the lactose content in said composition representing 0% by weight of lactose of the total sugar content in said composition, or of lactose in a content greater than 0% by weight and at most 30% by weight of the total sugar content in said composition, and in particular being between 5% by weight and 30% by weight of the total sugar content in said composition, for the production of proteins of interest by a strain of fungus belonging to the *Trichoderma* genus in which the cel1a gene has been knocked out.

In a third aspect, the invention relates to a method of producing sugars from cellulosic or lignocellulosic substrates, comprising a step of producing cellulolytic enzymes by a strain of fungus belonging to the *Trichoderma* genus in which the cel1a gene has been knocked out, in the presence of a composition comprising at least lactose and a second sugar, the lactose content in said composition representing approximately between 0% and 30% or between 5% and 30% by weight of the total sugar content in said composition.

In a third aspect, the invention relates to a method of producing sugars from cellulosic or lignocellulosic substrates, comprising a step of producing cellulolytic enzymes by a strain of fungus belonging to the *Trichoderma* genus in which the cel1a gene has been knocked out, in the presence of a composition comprising at least lactose and a second sugar, the lactose content in said composition representing 0% by weight of lactose in the total sugar content in said composition, or lactose at a content greater than 0% weight and at most 30% by weight of the total sugar content in said composition, and in particular being between 5% by weight and 30% by weight of the total sugar content in said composition.

In other words, the invention relates to the use of a strain of fungus belonging to the *Trichoderma* genus in which the cel1a gene has been knocked out, for hydrolysis of cellulose or lignocellulose into sugar.

In a fourth aspect, the invention relates to a method of producing biobased products from cellulosic or lignocellulosic substrates, comprising a step of producing cellulolytic enzymes by a strain of fungus belonging to the *Trichoderma* genus in which the cel1a gene has been knocked out, in the presence of a composition comprising at least lactose and a second sugar, the lactose content in said composition representing approximately between 0% and 30% or between 5% and 30% by weight of the total sugar content in said composition.

In a fourth aspect, the invention relates to a method of producing biobased products from cellulosic or lignocellulosic substrates, comprising a step of producing cellulolytic enzymes by a strain of fungus belonging to the *Trichoderma* genus in which the cel1a gene has been knocked out, in the presence of a composition comprising at least lactose and a second sugar, the lactose content in said composition being 0% by weight of lactose in the total sugar content in said composition, or lactose at a content greater than 0% by weight and at most 30% by weight of the total sugar content in said composition, and in particular being between 5% by weight and 30% by weight of the total sugar content in said composition.

In other words, the invention relates to the use of a strain of fungus belonging to the *Trichoderma* genus in which the cel1a gene has been knocked out, for the production of biobased products from cellulosic or lignocellulosic substrates.

According to the invention, the term "biobased products" more particularly is understood to mean molecules of interest in the chemical industry, for example organic acids such as acetic, propionic, acrylic, butyric, succinic, malic, fumaric, citric, itaconic acids, or hydroxy acids such as glycolic, hydroxypropionic, or lactic acid, as well as other types of biobased products such as solvents and alcohols, for example ethanol, acetone, isopropanol, butanol.

In a fifth aspect, the invention relates to a method of producing a biofuel/alcohol, in particular ethanol, from cellulosic or lignocellulosic substrates, comprising a step of producing cellulolytic enzymes by a strain of fungus belonging to the *Trichoderma* genus in which the cel1a gene has been knocked out, in the presence of a composition comprising at least lactose and a second sugar, the lactose content in said composition representing approximately between 0% and 30% or between 5% and 30%, by weight of the total sugar content in said composition.

In a fifth aspect, the invention relates to a method of producing a biofuel/alcohol, in particular ethanol, from cellulosic or lignocellulosic substrates, comprising a step of producing cellulolytic enzymes by a strain of fungus belonging to the *Trichoderma* genus in which the cel1a gene has been knocked out, in the presence of a composition comprising at least lactose and a second sugar, the lactose content in said composition comprising 0% by weight of lactose in the total sugar content in said composition, or lactose at a content greater than 0% by weight and at most 30% by weight of the total sugar content in said composition, and in being particular between 5% by weight and 30% by weight of the total sugar content in said composition.

In other words, the invention relates to the use of a strain of fungus belonging to the *Trichoderma* genus in which the cel1a gene has been knocked out, for the production of biofuel/alcohol from cellulosic or lignocellulosic substrates.

According to the invention, the term "biofuel" refers more specifically to a second-generation biofuel, meaning from non-food resources. According to the invention, the term "biofuel" can also be defined as being any product resulting from the transformation of biomass and which can be used for energy purposes. On the one hand but without any desire for this to be limiting, one can mention as examples biogas, products which can be incorporated (possibly after subsequent transformation) into a fuel or can be a fuel in their own right, such as alcohols (ethanol, butanol, and/or isopropanol depending on the type of fermentation organism used), solvents (acetone), acids (butyric), lipids and their derivatives (short or long chain fatty acids, fatty acid esters), as well as hydrogen. Preferably, the biofuel according to the invention is an alcohol, for example ethanol, butanol, isopropanol, 1,2-propanediol, 1,3-propanediol, 1,4-butanediol, and/or 2,3-butanediol. More preferably, the biofuel according to the invention is ethanol. In another embodiment, the biofuel is biogas.

According to another particular embodiment, said method of producing a biofuel or alcohol from cellulosic or lignocellulosic substrates comprises the following steps:
i) a step of pretreating a cellulosic or lignocellulosic substrate in order to obtain a pretreated substrate,
ii) a step of producing cellulolytic enzymes by a strain of fungus belonging to the *Trichoderma* genus in which the cel1a gene has been knocked out, in the presence of a composition comprising at least lactose and a second sugar, the lactose content in said composition representing approximately between 0% and 30% or between 5% and 30%, by weight of the total sugar content in said composition,
iii) a step of enzymatic hydrolysis of the pretreated substrate, in the presence of the cellulolytic enzymes obtained in step ii) and an appropriate substrate, in order to obtain a hydrolysate,
iv) a step of alcoholic fermentation of the hydrolysate obtained,
v) a step of separation, in particular by distillation, said steps iii) and iv) optionally being carried out simultaneously.

According to one particular embodiment, said method of producing a biofuel or alcohol from cellulosic or lignocellulosic substrates comprises the following steps:
i) a step of pretreating a cellulosic or lignocellulosic substrate in order to obtain a pretreated substrate,
ii) a step of producing cellulolytic enzymes by a strain of fungus belonging to the *Trichoderma* genus in which the cel1a gene has been knocked out, in the presence of a composition comprising at least lactose and a second sugar, the lactose content in said composition representing 0% by weight of lactose in the total sugar content in said composition, or lactose at a content greater than 0% by weight and at most 30% by weight of the total sugar content in said composition, and in particular being between 5% by weight and 30% by weight of the total sugar content in said composition,
iii) a step of enzymatic hydrolysis of the pretreated substrate, in the presence of the cellulolytic enzymes obtained in step ii) and an appropriate substrate, in order to obtain a hydrolysate,
iv) a step of alcoholic fermentation of the hydrolysate obtained,
v) a step of separation, in particular by distillation.

According to another particular embodiment, said method of producing a biofuel or alcohol from cellulosic or lignocellulosic substrates comprises the following steps:

i) a step of pretreating a cellulosic or lignocellulosic substrate in order to obtain a pretreated substrate, ii) a step of producing cellulolytic enzymes by a strain of fungus belonging to the *Trichoderma* genus in which the cel1a gene has been knocked out, in the presence of a composition comprising at least lactose and a second sugar, the lactose content in said composition representing 0% by weight of lactose in the total sugar content in said composition, or lactose at a content greater than 0% by weight and at most 30% by weight of the total sugar content in said composition, and in particular being between 5% by weight and 30% by weight of the total sugar content in said composition, iii) a step of enzymatic hydrolysis of the pretreated substrate, in the presence of the cellulolytic enzymes obtained in step ii) and an appropriate substrate, in order to obtain a hydrolysate, iv) a step of alcoholic fermentation of the hydrolysate obtained, v) a step of separation, in particular by distillation, said steps iii) and iv) being carried out simultaneously. This is typically the case in what are referred to as "SSF" (Simultaneous Saccharification and Fermentation) production methods.

According to one particular embodiment, the step of pretreating a cellulosic or lignocellulosic substrate is a step of suspending said cellulosic or lignocellulosic substrate in the aqueous phase.

According to one particular embodiment, the hydrolysate obtained in step iii) is a hydrolysate containing glucose.

According to one particular embodiment, the step of alcoholic fermentation of the obtained hydrolysate is a step of fermenting, in the presence of a fermentative organism, the glucose originating from the hydrolysate so as to produce a fermentation broth. A fermentative organism is for example a yeast.

According to one particular embodiment, the step of separation is a separation of the biofuel or alcohol and the fermentation broth, in particular by distillation.

According to an even more preferred embodiment, the pretreated cellulosic or lignocellulosic substrate to be hydrolyzed is suspended in the aqueous phase at a percentage of 6 to 40% dry matter, preferably 20 to 30%. The pH is adjusted to between 4 and 5.5, preferably between 4.8 and 5.2, and the temperature to between 40° C. and 60° C., preferably between 45° C. and 50° C. The hydrolysis reaction is started by adding enzymes acting on the pretreated substrate. The amount of enzymes conventionally used is 10 to 30 mg of protein per gram of pretreated substrate or less. The reaction generally lasts 15 to 48 hours. The reaction is monitored by assaying the sugars released, in particular glucose. The sugar solution is separated from the non-hydrolyzed solid fraction, essentially consisting of lignin, by filtration or centrifugation and then treated in a fermentation unit.

According to another even more preferred embodiment, when the step of hydrolysis and fermentation are carried out jointly, the enzymes and the fermentative organism are added simultaneously and then incubated at a temperature between 30° C. and 35° C. in order to produce a fermentation broth. According to this embodiment, the cellulose present in the pretreated substrate is converted into glucose, and at the same time, in the same reactor, the fermentative organism (for example a yeast) converts the glucose into the final product according to an SSF process (Simultaneous Saccharification and Fermentation) known to those skilled in the art. Depending on the metabolic and hydrolytic capacities of the fermentative organism, for the operation to run smoothly this may require the addition of a greater or lesser amount of exogenous cellulolytic mixture.

In a sixth aspect, the invention relates to a strain of fungus belonging to the *Trichoderma reesei* species, said strain being derived from the strain deposited under ATCC reference 56765 (Rut-C30) and said strain comprising a knockout of the cel1a gene. The invention thus also relates to a RutC30 strain in which the genome has been modified to knock out the cel1a gene. The invention also relates to a strain derived from the RutC30 strain in which the genome has been modified to knock out the cel1a gene. This variant strain of RutC30 is therefore a strain in which the CEL1a protein is not produced, or else a non-functional CEL1a protein is produced.

According to one embodiment, such a strain is obtained by a process of genetic modification of a strain of Rut-C30 fungus, comprising a step of knocking out the cel1a gene. This step of knocking out the cel1a gene is carried out in particular by mutagenesis, by homologous recombination, or more preferably using a knockout cassette represented by SEQ ID NO: 3.

Mutagenesis is a technique commonly used in genetic engineering. It aims to deliberately introduce mutations into the DNA in order to create genetically modified genes. According to the invention, mutagenesis more particularly is understood to mean site-directed mutagenesis. Site-directed mutagenesis allows introducing identified mutations into a specific gene. To do this, the DNA of interest (here the cel1a gene) containing the mutations is synthesized and then introduced into the cell to be mutated, typically using a vector, where the DNA repair mechanism takes care of integrating it into the genome.

Homologous recombination is a technique commonly used in genetic engineering which consists of an exchange between DNA molecules, typically using a vector.

The term "vector" is understood to mean to any DNA sequence into which it is possible to insert fragments of foreign nucleic acid, the vectors enabling the insertion of foreign DNA into a host cell. Examples of vectors are plasmids, cosmids, yeast artificial chromosomes (YAC), bacterial artificial chromosomes (BAC) and P1-derived artificial chromosomes (PAC), and virus-derived vectors. The vector according to the invention allows introducing or deleting a mutation.

In a preferred embodiment, said knockout cassette comprises three DNA fragments:

(1) a region upstream of the target gene, (2) a selection marker, and (3) a region downstream of the target gene.

In the case of the invention, "target gene" is understood to mean the cel1a gene. The regions upstream and downstream of the target gene are two recombination elements, one at each end of the gene, and are required in order to precisely target the sequence to be knocked out.

According to the invention, the region upstream of the target gene (i.e. sequence 5' upstream of the cel1a gene) is in particular represented by the sequence of SEQ ID NO: 4.

According to the invention, the region downstream of the target gene (i.e. sequence 3' downstream of the cel1a gene) is in particular represented by the sequence of SEQ ID NO: 5.

The expression "selection marker" is understood to mean a gene whose expression gives the cells containing it a characteristic enabling their selection. The use of a selection marker allows identifying the cells which have integrated a genetic modification in comparison to those which have not.

This concerns for example a gene for resistance to antibiotics, in particular the gene for resistance to the antibiotic hygromycin hph, as represented by the sequence of SEQ ID NO: 6.

More specifically, according to the invention, the knockout cassette preferably consists of a resistance gene placed under the control of a promoter and a terminator, with the 5' and 3' regions flanking the cel1a gene upstream and downstream. According to the invention, said knockout cassette may be operatively coupled to a promoter, a terminator, or any other sequence necessary for its expression in a host cell.

The knockout cassette may be amplified using conventional techniques well known to those skilled in the art, typically by a method selected among conventional cloning, PCR fusion, or in vivo cloning by PCR. Preferably, this knockout cassette is amplified by PCR, in particular using the sequences represented by SEQ ID NO: 9 and SEQ ID NO: 11. The knockout cassette is then introduced by recombination into a strain of *Trichoderma*, in particular *Trichoderma reesei*, which does not express a gene of the selection marker. After culturing, the variant/mutant strains having incorporated the knockout cassette are selected according to whether or not the selection marker is expressed, the transformed clones expressing said selection marker. These are the strains to be used according to the invention. Preferably, the mutant strains are identified using the primers of SEQ ID NO: 8 and SEQ ID NO: 13. These genetic recombination techniques are well known to those skilled in the art.

In this description, the definitions, embodiment, and preferences indicated in one aspect apply mutatis mutandis to the other aspects. For example, all definitions and preferences given in the first aspect of the invention above also apply to the second, third, fourth, fifth, and sixth aspects.

BRIEF DESCRIPTION OF FIGURES

Other features, details, and advantages of the invention will become apparent upon reading the appended Figures.

FIG. 1 shows the plasmid pRS426-Δcel1a-hph which was used to obtain a strain in which the cel1a gene was knocked out. The positions of the various fragments of the knockout cassette and of the oligonucleotides used for the construction are indicated.

FIG. 2 shows the optimization of the composition of the lactose/glucose mixture used as a feed solution for the phase of protein production by *Trichoderma reesei* RutC30-Δcel1a.

FIG. 3 shows the comparison of the specific productivity of the RutC30 and RutC30-Δcel1a strains in a bioreactor when fed in fed-batch mode with sugar solutions of different compositions.

SEQUENCES OF THE INVENTION

TABLE 1

| Name of sequence | Sequence |
| --- | --- |
| SEQ ID NO: 1 | atgttgcccaaggactttcagtgggggttcgccacggctgcctaccagatcgagggcgcc gtcgaccaggacggccgcgggcccccagcatctgggacacgttctgcgcgcagcccggcaag atcgccgacggctcgtcgggcgtgacggcgtgcgactcgtacaaccgcacggccgaggac attgcgctgctcaagtcgctcggggccaagagctaccgcttctccatctcgtggtcgcgc atcatccccgagggcggccgcggcgatgccgtcaaccaggcgggcatcgaccactacgtc aagttcgtcgacgacctgctcgacgccggcatcacgccttcatcaccctcttccactgg gacctgcccgagggcctgcatcagcggtacggggggctgctgaaccgcaccgagttcccg ctcgactttgaaaactacgcccgcgtcatgttcagggcgctgcccaaggtgcgcaactgg atcaccttcaacgagccgctgtgctcggccatcccgggctacggctccggcaccttcgcc cccggccggcagagcacctcggagccgtggaccgtcggccacaacatcctcgtcgcccac ggccgcgccgtcaaggcgtaccgcgacgacttcaagcccgccagcggcgacggccagatc ggcatcgtcctcaacggcgacttcacctacccctgggacgccgccgaccggccgacaag gaggcggccgagcggcgcctcgagttcttcacggcctggttcgcggatcccatctacttg ggcgactacccggcgtcgatgcgcaagcagctgggcgaccggctgccgacctttacgccc gaggagcgcgccctcgtccacggctccaacgactttacggcatgaaccactacacgtcc aactacatccgccaccgcagctcgcccgcctccgccgacgacaccgtcggcaacgtcgac gtgctcttcaccaacaagcagggcaactgcatcggccccgagacgcagtcccccctggctg cgcccctgtgccgccggcttccgcgacttcctggtgtggatcagcaaggagtacggctac ccgcccatctacgtgacggagaacggcacgagcatcaagggcgagagcgacttgcccaag gagaagattctcgaagatgacttcagggtcaagtactataacgagtacatccgtgccatg gttaccgccgtggagctggacggggtcaacgtcaagggtactttgcctggtcgctcatg gacaactttgagtgggcggacggctacgtgacgaggtttggggttacgtatgtggattat gagaatgggcagaagcggttcccccaagaagagcgcaaagagcttgaagccgctgtttgac gagctgattgcggcggcgtga |
| SEQ ID NO: 2 | MLPKDFQWGFATAAYQIEGAVDQDGRGPSIWDTFCAQPGKIADGSSGVTACDSYNR TAEDIALLKSLGAKSYRFSISWSRIIPEGGRGDAVNQAGIDHYVKFVDDLLDAGITPFIT LFHWDLPEGLHQRYGGLLNRTEFPLDFENYARVMFRALPKVRNWITFNEPLCSAIPG YGSGTFAPGRQSTSEPWTVGHNILVAHGRAVKAYRDDFKPASGDGQIGIVLNGDFTY PWDAADPADKEAAERRLEFFTAWFADPIYLGDYPASMRKQLGDRLPTFTPEERALVH GSNDFYGMNHYTSNYIRHRSSPASADDTVGNVDVLFTNKQGNCIGPETQSPWLRPC AAGFRDFLVWISKRYGYPPIYVTENGTSIKGESDLPKEKILEDDFRVKYYNEYIRAMVT AVELDGVNVKGYFAWSLMDNFEWADGYVTRFGVTYVDYENGQKRFPKKSAKSLKP LFDELIAAA |
| SEQ ID NO: 3 | GTGACCGAACAGCAGCAGCAGCAGCAGGTGCCGACGACGACGGAGGCGAA GCGGAGCGCCGCGCTGCGCCAGTCGTTTGGCGTGCCCTGGTTCGAGACGCTGA TTGAGGGCTCGCGCCTGGGCAGCATGCGCCGGAGCTACGGGGCGCAGCGGTC GCGCGACGGGCAGGCGAGCATCGAGTGGGAGATTGTCGAGTTCTCGGACGGCG GCGGGGAGATGGACTTGGGCGAGGCGGACGACGCGGCGCTGCAGCAGCTGGG CAAGAGGAAGCATCACGAGGTTTGACCGGGGAGGGGGCCAAATAGCTTTGGGTA TTACACACACACGTGTGTGTGTGTGTGAGAGGTGCAAGTGAGGTGGCGAGTG |

TABLE 1-continued

| Name of sequence | Sequence |
|---|---|
| | AGTTGACTGAGTAACTGAGTGGCTGAGTGAGCGAGTGATGTGTAACAACAACAG |
| | CTGTCGGAAAACAAAAGGGGAACCGATACGCCGTTCGTGGTTCAGGGGTAATGT |
| | GTGTGTCTGGCATGGTTGGCGTGGTCCGGTCTGTATATGAGCTGTCGCTTCTGTA |
| | TCGTTTGTCTTCTTGTTGCAATTCTTTTTTTTCTTGTCCTCGGTCAGGCGTTGTTGT |
| | GCAGACAGTGGTTGGGGAGGGAGGCGGTTGTCTGTCCACCTTGCACCTTTTTCA |
| | TCATTTTGCCTTTAGGCGTAACTCGATAGCAGAGGCTATATAGAGAGATCCAGAT |
| | GGGAATCGACGCAAAACCTTTTGGAGTCACCACTCGGGACGCTTGTGCCTTTCGT |
| | CTTTATTATGCATAAATGCCACCTCCAGCCGGCGTGCAGCGTATACTTGTACACTT |
| | CAGACTTGTAGTAGTAGGTAGTACTGTATGTGACTAGGTACTATTCATCCGCAAA |
| | GTGTTGTCAAGGAACATGCGGCTTATAAGAGTAGCACTCGGCTGGAATATGGCGT |
| | TTGATCCTCGCAATCCAATTCCCCTTTGCATGATTACATGGCAACTGTCCCACGTG |
| | CTGTCTCGGCTGAATCTATCCGTCGGCTTACCAGAAAGAAACGAAGCCGGACAG |
| | AATAGCCAGATTTCCATACCTTCAACTCCTTTGTTTCTGTCTCCTATTCCCGCCATT |
| | CCCCGATGCCTCGAACTACTGGCAGCAAAAATCTCCCCGTCTTCTCACCTTTCGA |
| | CCACTCCTCCTCCTCCGATCCTCTCTTTCCCCTCTCAACGTCCCTCAGCGTACCA |
| | TCAAAGTGATAATCAGCAGCAGCAGCGGCAGCAGCTCTTTCGGAGTATCACCGT |
| | GTCACACCCTCTCCCCCCATCGCCGGGCTAAGCTGCTTGGAGCCGTCCGGATCG |
| | CCCGCCTCCGCTTCTCCAGCTTCCCCATTTACGTTGAGGTGCGGCTAGCCTTGC |
| | CTTGTGACTCGCCTTTTCTGCTTGTATCGGCCAGGGGGGGGTTTGGTTAGGTGG |
| | TTGGCTGGTTGGCTGGTTGGTTAGGATACTGTAGAAAAGGGATCCGAGAGCTAC |
| | CTTACATCAATATGGCCAGCACCTCTTCGGCGATACATACTCGCCACCCCAGCCG |
| | GGGCGATTGTGTGTACTAGGTAGGCTCGTACTATACCAGCAGGAGAGGTGCTGC |
| | TTGGCAATCGTGCTCAGCTGTTAGGTTGTACTTGTATGGTACTTGTAAGGTGGTC |
| | ATGCAGTTGCTAAGGTACCTAGGGAGGGATTCAACGAGCCCTGCTTCCAATGTCC |
| | ATCTGGATAGGATGGCGGCTGGCGGGGCCGAAGCTGGGAACTCGCCAACAGTC |
| | ATATGTAATAGCTCAAGTTGATGATACCGTTTTGCCAGGATTAGGATGCGAGAAG |
| | CAGCATGAATGTCGCTCATCCGATGCCGCATCACCGTTGTGTCAGAAACGACCAA |
| | GCTAAGCAACTAAGGTACCTTACCGTCCACTATCTCAGGTAACCAGGTACTACCA |
| | GCTACCCTACCTGCCGTGCCTACCTGCTTTAGTATTAATCTTTCCACCTCCCTCCT |
| | CAATCTTCTTTTCCCTCCTCTCCTCTTTTTTTTTCTTCCTCCTCTTCTTCTCCATAA |
| | CCATTCCTAACAACATCGACATTCTCTCCTAATCACCAGCCTCGCAAATCCTCAGG |
| | TTAGTATTACTACTACTACAATCATCACCACGATGCTCCGCCCGACGATGCGGCT |
| | TCTGTTCGCCTGCCCCTCCTCTCACTCGTGCCCTTGACGAGCTACCCCGCCAGA |
| | CTCTCCTGCGTCACCAATTTTTTTCCCTATTTACCCCTCCTCCCTCTCTCCCTCTC |
| | GTTTCTTCCTAACAAACAACCACCACCAAAATCTCTTTGGAAGCTCACGACTCACG |
| | CAAGCTCAATTCGCAGATACAAATCTAGAATGAAAAAGCCTGAACTCACCGCGAC |
| | GTCTGTCGAGAAGTTTCTGATCGAAAAGTTCGACAGCGTCTCCGACCTGATGCAG |
| | CTCTCGGAGGGCGAAGAATCTCGTGCTTTCAGCTTCGATGTAGGAGGGCGTGGA |
| | TATGTCCTGCGGGTAAATAGCTGCGCCGATGTTTCTACAAAGATCGTTATGTTTA |
| | TCGGCACTTTGCATCGGCCGCGCTCCCGATTCCGGAAGTGCTTGACATTGGGGA |
| | ATTCAGCGAGAGCCTGACCTATTGCATCTCCCGCCGTGCACAGGGTGTCACGTT |
| | GCAAGACCTGCCTGAAACCGAACTGCCCGCTGTTCTGCAGCCGGTCGCGGAGG |
| | CCATGGATGCGATCGCTGCGGCCGATCTTAGCCAGACGAGCGGGTTCGGCCCAT |
| | TCGGACCGCAAGGAATCGGTCAATACACTACATGGCGTGATTTCATATGCGCGAT |
| | TGCTGATCCCCATGTGTATCACTGGCAAACTGTGATGGACGACACCGTCAGTGC |
| | GTCCGTCGCGCAGGCTCTCGATGAGCTGATGCTTTGGGCCGAGGACTGCCCCG |
| | AAGTCCGGCACCTCGTGCACGCGGATTTCGGCTCCAACAATGTCCTGACGGACA |
| | ATGGCCGCATAACAGCGGTCATTGACTGGAGCGAGGCGATGTTCGGGGATTCCC |
| | AATACGAGGTCGCCAACATCTTCTTCTGGAGGCCGTGGTTGGCTTGTATGGAGCA |
| | GCAGACGCGCTACTTCGAGCGGAGGCATCCGGAGCTTGCAGGATCGCCGCGGC |
| | TCCGGGCGTATATGCTCCGCATTGGTCTTGACCAACTCTATCAGAGCTTGGTTGA |
| | CGGCAATTTCGATGATGCAGCTTGGGCGCAGGGTCGATGCGACGCAATCGTCCG |
| | ATCCGGAGCCGGGACTGTCGGGCGTACACAAATCGCCCGCAGAAGCGCGGCCG |
| | TCTGGACCGATGGCTGTGTAGAAGTACTCGCCGATAGTGGAAACCGACGCCCCA |
| | GCACTCGTCCGAGGGCAAAGGAATAATGCATGTGCTGTGTTCCTCAGAATGGGC |
| | CCCAGAAGGGCGTCGAGCATTGTCTATGAATGCAAACAAAAATAGTAAATAAATA |
| | GTAATTCTGGCCATGACGAATAGAGCCAATCTGCTCCACTTGACTATCCTTGTGA |
| | CTGTATCGTATGTCGAACCCTTGACTGCCCATTCAAACAATTGTAAAGGAATATGA |
| | GCTACAAGTTATGTCTCACGTTTGCGTGCGAGCCCGTTTGTACGTTATTTTGAGAA |
| | AGCGTTGCCATCACATGCTCACAGTCACTTGGCTTACGATCATGTTTGCGATCTTT |
| | CGGTAAGAATACACAGAGTAACGATTATACATCCATCGCTTTCTATGATTAGGTAC |
| | TCAGACAACACATGGGAAACAAGATAACCATCGCATGCAAGGTCGATTCCAATCA |
| | TGATCTGGACTGGGGTATTCCATCTAAGCCATAGTACCCTCGAGCCCATCATCGT |
| | CTGCGCCATGGCGCTCATGGCGGACGGGGGCATGGATGATGGCATGGATGATG |
| | GCATGGATGATGGCATGGACGATGGCATGGACGATGGCTGGGGCCCGCCACCG |
| | CCCTTAACGGGACCGTAGATGGCCTCGTCGTCGCTCGTGTCATCTGTATCATCGT |
| | CGTCGTCTTCGTCCTTTTTCGCTTTTGGGTGCTTCGCGCGGAGACGCATATTCTT |
| | TGCGACTTCGTCCGCGCTGAAGCCGTAGATGCTCTTGAGGTAGCGCATGAACTC |
| | GAGGTACGCATCCGACACGATTTGCACATGCAAGTGCGTCAACTCGACCTTGGC |
| | ATCCTCATCCCTCACGCCCTGCTTCTTCTTTCCTTCTTCTCCCACGTTGGTGC |
| | TGCTGATGCTCCGATTCTGGGCGTCAAACTCGGCCATGGCCAGCGCCGTCTGGC |
| | ACGCGTTGCGAATCTGCCGGCCGTTCCAGCGCATGTTTTCGTGCTTCTTCCAGTA |
| | TGCGGTGGCGTACTTGAGAATGTCCTTTTCGTGGATGTCGATTTCGCGGCCCTTG |
| | TCGCGGAAGCGCTGCTTGATGATGCGCAGGTTGAGGCGGAAGATTTCGCGCGTG |
| | GACGATTTGTCGAGGGGCGGGTAGTAGAGGGAGATGTGGATGCGGGAGGTGAA |
| | GGCCTCGTCAAAGTCGCCGATGCGGTTGGTCGTGAGGAAGAGGATGCCTGCGTA |
| | GTATTCGAGGACGCGGAGGAAGACTTGAGTTGACGAGAGTTTAGCTGATTCTGA |

TABLE 1-continued

| Name of sequence | Sequence |
|---|---|
| | GTAGGGGGTAGCGCACAGATAGGGGTAAAGGGGTTGGAGGTCAACTTACCTGCT<br>ACGAGGCCGTTGCGGACAAAGTTCTTGGGGGAGCGCTGGGCGAGAAAGACGTC<br>TGCTTCGTCGAGGAGGAGGATGCAGCCCCATCGGTTGGCCAGGCTAAAGTTTCT<br>CTCCAGGGCCGCTTCTACTTCACTGGCAGTTGCACCAAGATCTCCTGCAAAAGGA<br>GTTGTTGTGTACATGCTTTAGCCTATATGAATCTTGTAGATTACTTGGACACAGGA<br>AGTGACAGTGCACATACCGCAGGTGATTTGGAACAAAGGCTTGTTGAAGCGTTCG<br>GCAACACCCTCTATAACATCCATGTCAGCACATGTACGAGGAGGGTTGGCATGAT<br>TCTCTGAACTTACCAGCAGTTGTTGTCTTTCCCACGCCTGGACTTCCATGTAACAG<br>AAGAATGAGGCCCTTCCCTGTATAAAGAAGTCAGTTGATTCGCGCTCAAAAAGCC<br>TTGTCAAAAAGGGGAATACCTTTGCCTCGAATAATGTCCACCTCTTCATTATCGCT<br>AACCCTCGCCTCCTTGTTCCGAAAGTGCTGGTCAACCAAACAATACACAATGTCC<br>TTGTGCTGCTTCGGGAGCACCAGCTGGTCAAACGCCGTCTGCTCTTTTGAGCCCT<br>CGCTGACGGGACTGAGATACTTGAGATCGAGCTTCGCTATCCAGCAAGTCAGCA<br>CACACACTCTTCAACGCAGTAAAAAAGAGAAGAAAAAGGGGGGGATAAGTGA<br>CGAACCC |
| SEQ ID<br>NO: 4 | <u>ACGATGATACCGACGCCGCC</u>GTGACCGAACAGCAGCAGCAGCAGCAGGTG<br>CCGACGACGACGGAGGCGAAGCGGAGCGCCGCGTCGCCCAGTCGTTTGGCGT<br>GCCCTGGTTCGAGACGCTGATTGAGGGCTCGCGCCTGGGCAGCATGCGCCGGA<br>GCTACGGGGCGCAGCGGTCGCGCGACGGGCAGGCGAGCATCGAGTGGGAGAT<br>TGTCGAGTTCTCGGACGGCGGCGGGGAGATGGACTTGGGCGAGGCGGACGACG<br>CGGCGCTGCAGCAGCTGGGCAAGAGGAAGCATCACGAGGTTTGACCGGGGAGG<br>GGGCCAAATAGCTTTGGGTATTACACACACACGTGTGTGTGTGTGTGAGAGGT<br>GCAAGTGAGGTGGCGAGTGAGTTGACTGAGTAACTGAGTGGCTGAGTGAGCGAG<br>TGATGTGTAACAACAACAGCTGTCGGAAAACAAAAGGGGAACCGATACGCCGTTC<br>GTGGTTCAGGGGTAATGTGTGTGTCTGGCATGGTTGGCGTGGTCCGGTCTGTAT<br>ATGAGCTGTCGCTTCTGTATCGTTTGTCTTCTTGTTGCAATTCTTTTTTTCTTGTC<br>CTCGGTCAGGCGTTGTTGTGCAGACAGTGGTTGGGGAGGGAGGCGGTTGTCTGT<br>CCACCTTGCACCTTTTTCATCATTTTGCCTTTAGGCGTAACTCGATAGCAGAGGCT<br>ATATAGAGAGATCCAGATGGGAATCGACGCAAAACCTTTTGGAGTCACCACTCGG<br>GACGCTTGTGCCTTTCGTCTTTATTATGCATAAATGCCACCTCCAGCCGGCGTGC<br>AGCGTATACTTGTACACTTCAGACTTGTAGTAGTAGGTAGTACTGTATGTGACTAG<br>GTACTATTCATCCGCAAAGTGTTGTCAAGGAACATGCGGCTTATAAGAGTAGCAC<br>TCGGCTGGAATATGGCGTTTGATCCTCGCAATCCAATTCCCCTTTGCATGATTACA<br>TGGCAACTGTCCCACGTGCTGTCTCGGCTGAATCTATCCGTCGGCTTACCAGAAA<br>GAAACGAAGCCGGACAGAATAGCCAGATTTCCATACCTTCAACTCCTTTGTTTCT<br>GTCTCCTATTCCCGCCATTCCCCGATGCCTCGAACTACTGGCAGCAAAAATCTCC<br>CCGTCTTCTCACCTTTCGACCACTCCTCCTCCTCCGATCCTCTCTTTCCCCTCTCA<br>ACGTCCCTCAGCGTACCATCAAAGTGATAATCAGCAGCAGCAGCGGCAGCAGCT<br>CTTTCGGAGTATCACCGTGTCACACCCTCTCCCCCATCGCCGGGCTAAGCTGC<br>TTGGAGCCGTCCGGATCGCCCGCCTCCGCTTCTCCAGCTTCCCCATTTACGTTGA<br>GGTGCGGCTAGCCTTGCCTTGTGACTCGCCTTTTCTGCTTGTATCGGCCAGGGG<br>GGGGTTTGGTTAGGTGGTTGGCTGGTTGGCTGGTTGGTTAGGATACTGTAGAAA<br>AG |
| SEQ ID<br>NO: 5 | CCCATCATCGTCTGCGCCATGGCGCTCATGGCGGACGGGGGCATGGATGATGG<br>CATGGATGATGGCATGGATGATGATGGCATGGACGATGGCATGGCATGGATGGCTGGG<br>GCCCGCCACCGCCCTTAACGGGACCGTAGATGGCCTCGTCGTCGCTCGTGTCAT<br>CTGTATCATCGTCGTCGTCTTCGTCCTTTTTCGCTTTTGGGTGCTTCGCGCGGAG<br>ACGCATATTCTTTGCGACTTCGTCCGCGCTGAAGCGTAGATGCTCTTGAGGTAG<br>CGCATGAACTCGAGGTACGCATCCGACACGATTTGCACATGCAAGTGCGTCAACT<br>CGACCTTGGCATCCTCATCCCTCACGCCCTGCTTCTTCTTCTTTCCTTCTTCTCCC<br>ACGTTGGTGCTGCTGATGCTCCGATTCTGGGCGTCAAACTCGGCCATGGCCAGC<br>GCCGTCTGGCACGCGTTGCGAATCTGCCGGCCGTTCCAGCGCATGTTTTCGTGC<br>TTCTTCCAGTATGCCGGTGGCGTACTTGAGAATGTCCTTTTCGTGGATGTCGATTTC<br>GCGGCCCTTGTCGCGGAAGCGCTGCTTGATGATGCGCAGGTTGAGGCGGAAGA<br>TTTCGCGCGTGGACGATTTGTCGAGGGGCGGGTAGTAGAGGGAGATGTGGATG<br>CGGGAGGTGAAGGCCTCGTCAAAGTCGCCGATGCGGTTGGTCGTGAGGAAGAG<br>GATGCCTGCGTAGTATTCGAGGACGCGGAGGAAGACTTGAGTTGACGAGAGTTT<br>AGCTGATTCTGAGTAGGGGTAGCGCACAGATAGGGGTAAAGGGGTTGGAGGTC<br>AACTTACCTGCTACGAGGCCGTTGCGGACAAAGTTCTTGGGGAGCGCTGGGCG<br>AGAAAGACGTCTGCTTCGTCGAGGAGGAGGATGCAGCCCCATCGGTTGGCCAG<br>GCTAAAGTTTCTCTCCAGGGCCGCTTCTACTTCACTGGCAGTTGCACCAAGATCT<br>CCTGCAAAAGGAGTTGTTGTGTACATGCTTTAGCCTATATGAATCTTGTAGATTAC<br>TTGGACACAGGAAGTGACAGTGCACATACCGCAGGTGATTTGGAACAAAGGCTT<br>GTTGAAGCGTTCGGCAACACCCTCTATAACATCCATGTCAGCACATGTACGAGGA<br>GGGTTGGCATGATTCTCTGAACTTACCAGCAGTTGTTGTCTTTCCCACGCCTGGA<br>CTTCCATGTAACAGAAGAATGAGGCCCTTCCCTGTATAAAGAAGTCAGTTGATTC<br>GCGCTCAAAAAGCCTTGTCAAAAAGGGGAATACCTTTGCCTCGAATAATGTCCAC<br>CTCTTCATTATCGCTAACCCTCGCCTCCTTGTTCCGAAAGTGCTGGTCAACCAAA<br>CAATACACAATGTCCTTGTGCTGCTTCGGGAGCACCAGCTGGTCAAACGCCGTCT<br>GCTCTTTTGAGCCCTCGCTGACGGGACTGAGATACTTGAGATCGAGCTTCGCTAT<br>CCAGCAAGTCAGCACACACTCTTCAACGCAGTAAAAAAGAGAAGAAAAAGGG<br>GGGGATAAGTGACGAACCC<u>CCATTTACGGCTCCTCAACACA</u> |

TABLE 1-continued

| Name of sequence | Sequence |
|---|---|
| SEQ ID NO: 6 | GGATCCGAGAGCTACCTTACATCAATATGGCCAGCACCTCTTCGGCGATACATAC<br>TCGCCACCCCAGCCGGGGCGATTGTGTGTACTAGGTAGGCTCGTACTATACCAG<br>CAGGAGAGGTGCTGCTTGGCAATCGTGCTCAGCTGTTAGGTTGTACTTGTATGGT<br>ACTTGTAAGGTGGTCATGCAGTTGCTAAGGTACCTAGGGAGGGATTCAACGAGC<br>CCTGCTTCCAATGTCCATCTGGATAGGATGGCGGCTGGCGGGGCCGAAGCTGG<br>GAACTCGCCAACAGTCATATGTAATAGCTCAAGTTGATGATACCGTTTTGCCAGG<br>ATTAGGATGCGAGAAGCAGCATGAATGTCGCTCATCCGATGCCGCATCACCGTT<br>GTGTCAGAAACGACCAAGCTAAGCAACTAAGGTACCTTACCGTCCACTATCTCAG<br>GTAACCAGGTACTACCAGCTACCCTACCTGCCGTGCCTACCTGCTTTAGTATTAA<br>TCTTTCCACCTCCCTCCTCAATCTTCTTTTCCCTCCTCTCCTCTTTTTTTTTCTTCC<br>TCCTCTTCTTCTCCATAACCATTCCTAACAACATCGACATTCTCTCCTAATCACCA<br>GCCTCGCAAATCCTCAGGTTAGTATTACTACTACTACAATCATCACCACGATGCTC<br>CGCCCGACGATGCGGCTTCTGTTCGCCTGCCCCTCCTCTCACTCGTGCCCTTGA<br>CGAGCTACCCCGCCAGACTCTCCTGCGTCACCAATTTTTTTCCCTATTTACCCCTC<br>CTCCCTCTCTCCCTCTCGTTTCTTCCTAACAAACAACCACCACCAAAATCTCTTTG<br>GAAGCTCACGACTCACGCAAGCTCAATTCGCAGATACAAATCTAGAATGAAAAAG<br>CCTGAACTCACCGCGACGTCTGTCGAGAAGTTTCTGATCGAAAAGTTCGACAGCG<br>TCTCCGACCTGATGCAGCTCTCGGAGGGCGAAGAATCTCGTGCTTTCAGCTTCG<br>ATGTAGGAGGGCGTGGATATGTCCTGCGGGTAAATAGCTGCGCCGATGGTTTCT<br>ACAAAGATCGTTATGTTTATCGGCACTTTGCATCGGCCGCGCTCCCGATTCCGGA<br>AGTGCTTGACATTGGGGAATTCAGCGAGAGCCTGACCTATTGCATCTCCCGCCGT<br>GCACAGGGTGTCACGTTGCAAGACCTGCCTGAAACCGAACTGCCCGCTGTTCTG<br>CAGCCGGTCGCGGAGGCCATGGATGCGATCGCTGCGGCCGATCTTAGCCAGAC<br>GAGCGGGTTCGGCCCATTCGGACCGCAAGGAATCGGTCAATACACTACATGGCG<br>TGATTTCATATGCGCGATTGCTGATCCCCATGTGTATCACTGGCAAACTGTGATG<br>GACGACACCGTCAGTGCGTCCGTCGCGCAGGCTCTCGATGAGCTGATGCTTTGG<br>GCCGAGGACTGCCCCGAAGTCCGGCACCTCGTGCACGCGGATTTCGGCTCCAA<br>CAATGTCCTGACGGACAATGGCCGCATAACAGCGGTCATTGACTGGAGCGAGGC<br>GATGTTCGGGGATTCCCAATACGAGGTCGCCAACATCTTCTTCTGGAGGCCGTG<br>GTTGGCTTGTATGGAGCAGCAGACGCGCTACTTCGAGCGGAGGCATCCGGAGCT<br>TGCAGGATCGCCGCGGCTCCGGGCGTATATGCTCCGCATTGGTCTTGACCAACT<br>CTATCAGAGCTTGGTTGACGGCAATTTCGATGATGCAGCTTGGGCGCAGGGTCG<br>ATGCGACGCAATCGTCCGATCCGGAGCCGGGACTGTCGGGCGTACACAAATCGC<br>CCGCAGAAGCGCGGCCGTCTGGACCGATGGCTGTGTAGAAGTACTCGCCGATA<br>GTGGAAACCGACGCCCAGCACTCGTCCGAGGGCAAAGGAATAATGCATGTGCT<br>GTGTTCCTCAGAATGGGCCCCAGAAGGGCGTCGAGCATTGTCTATGAATGCAAA<br>CAAAAATAGTAAATAAATAGTAATTCTGGCCATGACGAATAGAGCCAATCTGCTCC<br>ACTTGACTATCCTTGTGACTGTATCGTATGTCGAACCCTTGACTGCCCATTCAAAC<br>AATTGTAAAGGAATATGAGCTACAAGTTATGTCTCACGTTTGCGTGCGAGCCCGT<br>TTGTACGTTATTTTGAGAAAGCGTTGCCATCACATGCTCACAGTCACTTGGCTTAC<br>GATCATGTTTGCGATCTTTCGGTAAGAATACACAGAGTAACGATTATACATCCATC<br>GCTTTCTATGATTAGGTACTCAGACAACACATGGGAAACAAGATAACCATCGCAT<br>GCAAGGTCGATTCCAATCATGATCTGGACTGGGGTATTCCATCTAAGCCATAGTA<br>CCCTCGAG |
| SEQ ID NO: 7 | GGATCCGAGAGCTACCTTAC |
| SEQ ID NO: 8 | CTCGAGGGTACTATGGCTTA |
| SEQ ID NO: 9 | GTAACGCCAGGGTTTTCCCAGTCACGACGACGATGATACCGACGCCGCC |
| SEQ ID NO: 10 | CATATTGATGTAAGGTAGCTCTCGGATCCCTTTTCTACAGTATCCTAACCA |
| SEQ ID NO: 11 | TATTCCATCTAAGCCATAGTACCCTCGAGCCCATCATCGTCTGCGCCA |
| SEQ ID NO: 12 | GCGGATAACAATTTCACACAGGAAACAGCTGTGTTGAGGAGCCGTAAATG |
| SEQ ID NO: 13 | ATCACCACGAAGCTTTGTCT |

BIBLIOGRAPHY OF EXAMPLES

Hartl, Lukas; Kubicek, Christian P.; Seiboth, Bernhard (2007): Induction of the gal pathway and cellulase genes involves no transcriptional inducer function of the galactokinase in *Hypocrea jecorina*. In *The Journal of Biological Chemistry* 282 (25), pp. 18654-18659. DOI: 10.1074/jbc.M700955200.

Christianson, T. W.; Sikorski, R. S.; Dante, M.; Shero, J. H.; Hieter, P. (1992): Multifunctional yeast high-copy-number shuttle vectors. In *Gene* 110 (1), pp. 119-122.

Montenecourt, B. S.; Eveleigh, D. E. (1977) Semiquantitative Plate Assay for Determination of Cellulase Production by *Trichoderma viride*. In: Applied and environmental microbiology, vol. 33, no. 1, p. 178-183.

Schiestl, Robert H.; Gietz, R. Daniel (1989): High efficiency transformation of intact yeast cells using single stranded nucleic acids as a carrier. In *Current Genetics* 16 (5), pp. 339-346. DOI: 10.1007/BF00340712.

EXAMPLES

Example 1: Knocking Out the cel1a Gene in a Hyperproducing Strain

For construction of the cel1a knockout cassette containing the hygromycin B resistance gene (hph), the flanking regions (1 kb) of cel1a were amplified from *T. reesei* genomic DNA using Phusion polymerase (Thermo Fisher Scientific) and with the help of the following oligonucleotides: cel1a-5F and cel1a-5R; cel1a-3F and cel1a-3R (see Table 2). The hph marker was amplified from pLHhph1 plasmid using the hphF and hphR oligonucleotides (Hartl et al., 2007). The oligonucleotides used for amplification of the flanking regions overlap the different fragments of the construct (FIG. 1). The deletion cassette will be assembled in plasmid pRS426 by homologous recombination during passage in yeast. Yeast transformation was performed using the method described by Schiestl and Gietz (1989). The yeast strain ATCC 208405 was transformed with the two flanking regions, the hph marker, and plasmid pRS426 previously digested with EcoRI and XbaI (Christianson et al., 1992) to give plasmid pRS426-Δcel1a-hph. The plasmid was then introduced and amplified in NEB (New England Biolabs) 10-beta thermo-competent *E. coli* bacteria. The cel1a-3F and cel1a-5R oligonucleotides were used to amplify the knockout cassette from the plasmid pRS426-Δcel1a-hph. The cassette was purified using the QIAquick PCR purification kit (QIAGEN). The strain used for transformation is the hyperproducing strain RutC30 (Montenecourt and Eveleigh, 1977). The strain was transformed by the protoplast method (Penttila et al. (1987) using 1 μg of purified cassette. Integration of the hph cassette was verified by PCR using the cel1a_ch and hphR oligonucleotides so as to obtain a PCR product only if the cassette was inserted correctly. Three independent clones were isolated and analyzed as biological replicates. The sequences and names of the primers are presented in Tables 1 and 2. The strain with knocked out cel1a gene is named RutC30-Δcel1a.

TABLE 2

| Name of primer | Sequences corresponding to the primer |
| --- | --- |
| hphF | SEQ ID NO: 7 |
| hphR | SEQ ID NO: 8 |
| cel1a-5F | SEQ ID NO: 9 |
| cel1a-5R | SEQ ID NO: 10 |
| cel1a-3F | SEQ ID NO: 11 |
| cel1a-3R | SEQ ID NO: 12 |
| cel1a_ch | SEQ ID NO: 13 |

Sequences of Primers of the Invention

Example 2: Flask Culture Protocol

Fed flask cultures are carried out in Erlenmeyer flasks 8 cm in diameter, containing 60 mL of culture medium, inoculated with spores of the desired strain stored in cryovials, and incubated at 150 rpm and 30° C. in an INFORS Multitron incubator.

The culture medium has the following final composition:
- 1 mL/L of 85% $H_3PO_4$
- 2.8 g/L of $(NH_4)_2SO_4$
- 0.3 g/L of $MgSO_4$, $7H_2O$
- 0.15 g/L of $CaCl_2$, $2H_2O$
- 1 mL/L of trace element solution ($FeSO_4$: 5 g/L, $MnSO_4$: 1.4 g/L, $ZnSO_4$: 1.4 g/L, $CoCl_2$: 3.7 g/l)
- 8.0 g/L of dipotassium phtalate
- 1.5 g/L of cornsteep
- 12.5 g/L of glucose
- pH adjusted to 5.4 with 30% sodium hydroxide
- Sterilization for 20 min at 121° C. (the glucose is sterilized separately from the other compounds)

The first phase, the growth phase, is carried out for 48 hours until the glucose is exhausted, which leads to acidification of the medium to a pH of approximately 3.5. The pH is then raised to about 4.3 by adding sodium hydroxide.

The second phase, the production phase, is carried out for 48 hours by feeding at 0.3 mL/h a "fed-batch" solution containing:
- 50 g/L of sugars (pure lactose, or lactose+glucose mixtures)
- 5.6 g/L of urea (added from a 250 g/L stock sterilized by filtration) which allows mimicking the ammonia which would be provided by pH regulation during culture in a bioreactor.

2 mL samples are regularly collected in order to monitor the pH, residual glucose, and protein concentration. At the end of each of the two phases, a larger sample (approximately 10 mL) is collected in order to measure the fungus concentration in the culture medium (by filtration and drying on a 1.2 μm filter).

To assess the level of induction of a sugar composition on the strain, the specific production rate (in $mg_{proteins}/g_{biomass}/h$) is calculated by relating the protein productivity (in $mg_{proteins}/L/h$) to fungus concentration ($g_{biomass}/L$).

Example 3: Optimization of the Fed-Batch Composition for Induction of the RutC30-Δcel1a Strain The RutC30-Δcel1a strain was cultured according to the protocol described in Example 2 in order to measure the specific protein productivity of the strain when fed in fed-batch mode with different glucose/lactose mixtures. The glucose/lactose mixtures tested range from 99% glucose/1% lactose to 50% glucose/50% lactose. The % is understood here to mean in relation to the total amount of sugars present in the solution.

The specific productivity is presented in FIG. 2 after normalization by the maximum value that was measured. Maximum productivity is observed with the 15% lactose/85% glucose mixture, optimal productivity with the lactose content in the range between 10% and 20%, and good productivity with the lactose content in the range between 5% and 30%.

Example 4: Bioreactor Culture Protocol

Cultures in bioreactors are carried out in fermenters 10 cm in diameter, containing 800 mL of culture medium, inoculated at a concentration of 10% v/v from a preculture. Stirring is carried out by a Rushton turbine and a 5 cm diameter pitched blade turbine. The stirring speed is controlled to be between 400 and 1200 rpm in order to maintain a concentration of dissolved oxygen above 40% of the saturation concentration. The temperature is controlled to be 27° C. during the first phase then 25° C. during the second phase. The pH is controlled to be 4.0 throughout the culture, by automatic addition of a 5N ammonia solution.

The preculture is carried out in flasks 19 cm in diameter containing 250 mL of the same culture medium, buffered with 5 g/L dipotassium phthalate and its initial pH adjusted to 5.0 with sodium hydroxide. The precultures are inoculated with spores of the desired strain stored in cryovials, and incubated at 150 rpm and 30° C. in an INFORS Multitron incubator.

The culture medium has the following final composition:
3 mL/L of 85% phosphoric acid
0.25 mL/L of 96% sulfuric acid
1.66 g/L of KOH potash in crystals
2.8 g/L of $(NH_4)_2SO_4$
0.6 g/L of $MgSO_4, 7H_2O$
0.6 g/L of $CaCl_2, 2H_2O$
0.12 g/L of $Na_2HPO_4, 12H_2O$
1 mL/L of trace element solution ($FeSO_4$: 5 g/L, $MnSO_4$: 1.4 g/L, $ZnSO_4$: 1.4 g/L, $CoCl_2$: 3.7 g/l)
1 g/L of cornsteep
20 g/L of glucose
Sterilization for 20 min at 121° C. (the glucose is sterilized separately from the other components)
pH adjusted to 4.0 with the ammonia solution used for pH control.

The first phase (batch growth on glucose) is carried out for 27 to 30 hours (until the glucose is exhausted), then the second phase (protein production in fed-batch mode) is carried out for 70 hours by feeding a 250 g/L sugar solution containing either pure lactose or a mixture of lactose and glucose.

Samples of approximately 15 mL are collected regularly in order to:
monitor the residual glucose
measure the fungus concentration (by filtration then drying on 1.2 μm filters)
measure the protein concentration (Bio-Rad DC Protein Assay kit using BSA as the standard).

Example 5: Performance Comparison of RutC30 and RutC30-Δcel1a Strains Using Purified Sugar Solutions as Substrate To measure more precisely the specific rate of protein production of the RUTC30-Δcel1a strain when it is fed the different optimal solutions (identified in Example 3), and to compare with the RutC30reference strain, cultures were carried out in bioreactors using these two strains and with different feeding solutions for the fed-batch production phase, according to the protocol described in Example 4. The results are presented in FIG. 3.

The RutC30 wild strain fed a pure lactose solution has a specific productivity of 20 to 22 $mg_{proteins}/g_{biomass}/h$. Feeding this same strain with a solution containing a mixture composed of 10% lactose and 90% glucose gives a specific productivity that is approximately 2.5 times lower, around 8 $mg_{proteins}/g_{biomass}/h$. This strategy would therefore not be of interest industrially because the additional cost related to lower productivity would not be offset by the savings from using less lactose.

The RutC30-Δcel1a strain fed a pure lactose solution has a very low specific productivity of around 3 $mg_{proteins}/g_{biomass}/h$, because it is no longer able to assimilate a large amount of lactose. On the other hand, when it is fed a solution containing a glucose/lactose mixture with 10 to 20% of lactose in the mixture, the RutC30-Δcel1a strain has a specific productivity of between 16 and 19 $mg_{proteins}/g_{biomass}/h$, which is almost as good as the RutC30 strain fed pure lactose. With 10% or 15% lactose in the mixture, a specific productivity that is equivalent (not significantly different) to the RutC30 control fed pure lactose has been observed.

Example 6: Performance of the RutC30-Δcel1a Strain by Incorporating Industrial Solutions as the Production Substrate To measure the performance of the RutC30-Δcel1a strain under industrial conditions, cultures were carried out in a bioreactor by incorporating a crude extract of water-soluble pentoses originating from pretreatment of a lignocellulosic biomass. This extract is incorporated as a replacement for water in the preparation of feed solutions for the fed-batch production phase.

Two crude extracts of water-soluble pentoses were used, one prepared by pretreatment of corn stover, and the other prepared by pretreatment of wheat straw.

The cultures are carried out according to the protocol described in Example 4, with the only difference being that the feed solution for the second phase (production phase) was prepared by dissolving the glucose and lactose in the crude extract of water-soluble pentoses, so as to obtain a solution containing a total of 500 $g_{sugars}/L_{solution}$ and a lactose content of 0%, 5%, or 10% (as % of the total sugars) depending on the case. The results are shown in Table 3 below.

The RutC30-Δcel1a strain, fed with a solution containing a crude extract of water-soluble pentoses (from both wheat straw and corn stover) retains a maximum specific rate of protein production (around 21 to 22 $mg_{proteins}/g_{biomass}/h$) even if the lactose content of the solution is only 10% or 5%.

Fed with a solution prepared from a crude extract of water-soluble pentoses from wheat straw and containing no lactose, the RutC30-Δcel1a strain produces proteins at a rate approximately 30% lower (≅14±2 $mg_{proteins}/g_{biomass}/h$). Even so, this performance is much better than that of the RutC30 strain which produces very little protein in this case (≅4±1 $mg_{proteins}/g_{biomass}/h$).

Table 3 below shows the specific productivity in a bioreactor of the RutC30-Δcel1a strain when it is fed in fed-batch mode with sugar solutions of different compositions and prepared using a crude extract of water-soluble pentoses originating from corn stover or wheat straw.

TABLE 3

| Strain | Composition of the feed solution for production | Specific rate of production (mg$_{proteins}$/g$_{biomass}$/h) |
|---|---|---|
| RutC30-Δcel1a | Crude extract of water-soluble pentoses originating from corn stover + glucose + lactose (10% of total sugars) | 22 ± 2 |
| RutC30-Δcel1a | Crude extract of water-soluble pentoses originating from corn stover + glucose + lactose (5% of total sugars) | 22 ± 2 |
| RutC30-Δcel1a | Crude extract of water-soluble pentoses originating from wheat straw + glucose + lactose (10% of total sugars) | 21 ± 2 |
| RutC30-Δcel1a | Crude extract of water-soluble pentoses originating from wheat straw + glucose + lactose (5% of total sugars) | 21 ± 2 |
| RutC30-Δcel1a | Crude extract of water-soluble pentoses originating from wheat straw + glucose | 14 ± 2 |
| RutC30 | Crude extract of water-soluble pentoses originating from wheat straw + glucose | 4 ± 1 |

The invention claimed is:

1. A method of producing proteins by a strain of fungus belonging to the *Trichoderma* genus in which the cel1a gene has been knocked out, comprising at least two steps:
   a first step of growth in a batch phase in the presence of at least one carbon growth substrate, and
   a second step of producing proteins in a fed-batch phase in the presence of a composition comprising at least lactose and a second sugar, the lactose content in said composition representing between 0 and 30% by weight of the total sugar content in said composition.

2. The method according to claim 1, wherein that the lactose content in said composition is between more than 0% and 5% by weight of the total sugar content in said composition, or between more than 5% and less than 10% by weight of the total sugar content in said composition, or from 10% by weight to at most 20% by weight of the total sugar content in said composition.

3. The method of producing proteins according to claim 1, wherein the fungus belongs to the *Trichoderma reesei* species.

4. The method of producing proteins according to claim 1, wherein the proteins are enzymes.

5. The method of producing proteins according to claim 1, wherein the second sugar is selected among glucose or xylose.

6. The method of producing proteins according to claim 1, wherein the lactose content in said composition represents between 10 and 20% by weight of the total sugar content in said composition.

7. The method of producing proteins according to claim 1, wherein said composition comprises:
   between 70-95% by weight of glucose and/or xylose, and
   between 5-30% by weight of lactose.

8. The method of producing proteins according to claim 1, wherein said composition comprises:
   between 80-90% by weight of glucose and/or xylose, and
   between 10-20% by weight of lactose.

9. The method of producing proteins according to claim 1, wherein:
   said composition comprises between 90-95% by weight of crude extract of water-soluble pentoses and glucose and between 5-10% lactose, or
   the sugar content in said composition consists of 100% crude extract of water-soluble pentoses and glucose.

10. The method of producing proteins according to claim 1, wherein said second sugar is selected among glucose, xylose, the liquid residues obtained after ethanol fermentation of monomeric sugars of enzymatic hydrolysates of cellulosic biomass, a crude extract of water-soluble pentoses originating from pretreatment of a cellulosic biomass, an enzymatic hydrolysate of lignocellulose, and/or a hydrolysate of starchy biomass.

11. The method of producing proteins according to claim 1, wherein the cel1a gene has been knocked out in said strain by mutagenesis or by homologous recombination.

12. A method of producing sugars from cellulosic or lignocellulosic substrates, comprising a step of producing cellulolytic enzymes by a strain of fungus belonging to the *Trichoderma* genus in which the cel1a gene has been knocked out, in the presence of a composition comprising at least lactose and a second sugar, the lactose content in said composition representing between 0 and 30% by weight of the total sugar content in said composition.

13. A method of producing biobased products from cellulosic or lignocellulosic substrates, comprising a step of producing cellulolytic enzymes by a strain of fungus belonging to the *Trichoderma* genus in which the cel1a gene has been knocked out, in the presence of a composition comprising at least lactose and a second sugar, the lactose content in said composition representing between 0 and 30% by weight of the total sugar content in said composition.

14. A method of producing alcohol, from cellulosic or lignocellulosic substrates, comprising a step of producing cellulolytic enzymes by a strain of fungus belonging to the *Trichoderma* genus in which the cel1a gene has been knocked out, in the presence of a composition comprising at least lactose and a second sugar, the lactose content in said composition representing 0 and 30% by weight of the total sugar content in said composition.

15. The method of producing alcohol from cellulosic or lignocellulosic substrates according to claim 14, comprising:
   (i) a step of pretreating a cellulosic or lignocellulosic substrate in order to obtain a pretreated substrate,
   (ii) a step of producing cellulolytic enzymes by a strain of fungus belonging to the *Trichoderma* genus in which the cel1a gene has been knocked out, in the presence of a composition comprising at least lactose and a second sugar, the lactose content in said composition representing between 0 and 30% by weight of the total sugar content in said composition,
   (iii) a step of enzymatic hydrolysis of the pretreated substrate, in the presence of the cellulolytic enzymes obtained in step (ii) and an appropriate substrate, in order to obtain a hydrolysate,
   (iv) a step of alcoholic fermentation of the hydrolysate obtained,
   (v) a step of separation.

16. A strain of fungus belonging to the *Trichoderma reesei* species, said strain having come from the RutC30 strain as deposited under ATCC reference 56765, and said strain comprising a knockout of the cel1a gene.

17. The method of producing proteins according to claim 1, wherein said cel1a gene is a gene comprising nucleotide sequence of SEQ ID NO: 1 or a gene having at least 80% sequence identity with the nucleotide sequence SEQ ID NO: 1.

* * * * *

SEQUENCE LISTING

<160> NUMBER OF SEQ ID NOS: 13

<210> SEQ ID NO 1
<211> LENGTH: 1401
<212> TYPE: DNA
<213> ORGANISM: Trichoderma reesei

<400> SEQUENCE: 1

```
atgttgccca aggactttca gtggggttc gccacggctg cctaccagat cgagggcgcc      60
gtcgaccagg acggccgcgg ccccagcatc tgggacacgt tctgcgcgca gcccggcaag     120
atcgccgacg gctcgtcggg cgtgacggcg tgcgactcgt acaaccgcac ggccgaggac     180
attgcgctgc tcaagtcgct cggggccaag agctaccgct tctccatctc gtggtcgcgc     240
atcatccccg agggcggccg cggcgatgcc gtcaaccagg cgggcatcga ccactacgtc     300
aagttcgtcg acgacctgct cgacgccggc atcacgccct tcatcaccct cttccactgg     360
gacctgcccg agggcctgca tcagcggtac gggggctgc tgaaccgcac cgagttcccg     420
ctcgactttg aaaactacgc ccgcgtcatg ttcagggcgc tgcccaaggt gcgcaactgg     480
atcaccttca acgagccgct gtgctcggcc atcccgggct acggctccgg caccttcgcc     540
cccggccggc agagcacctc ggagccgtgg accgtcggcc acaacatcct cgtcgcccac     600
ggccgcgccg tcaaggcgta ccgcgacgac ttcaagcccc cagcggcga cggccagatc     660
ggcatcgtcc tcaacggcga cttcacctac ccctgggacg ccgccgaccc ggccgacaag     720
gaggcggccg agcggcgcct cgagttcttc acggcctggt tcgcggatcc catctacttg     780
ggcgactacc cggcgtcgat gcgcaagcag ctgggcgacc ggctgccgac ctttacgccc     840
gaggagcgcg ccctcgtcca cggctccaac gacttttacg gcatgaacca ctacacgtcc     900
aactacatcc gccaccgcag ctcgcccgcc tccgccgacg acaccgtcgg caacgtcgac     960
gtgctcttca ccaacaagca gggcaactgc atcgccccg agacgcagtc ccctggctg    1020
cgccctgtg ccgccggctt ccgcgacttc ctggtgtgga tcagcaagag gtacggctac    1080
ccgcccatct acgtgacgga gaacggcacg agcatcaagg gcgagagcga cttgcccaag    1140
gagaagattc tcgaagatga cttcagggtc aagtactata cgagtacat ccgtgccatg    1200
gttaccgccg tggagctgga cggggtcaac gtcaaggggt actttgcctg gtcgctcatg    1260
gacaactttg agtgggcgga cggctacgtg acgaggtttg gggttacgta tgtggattat    1320
gagaatgggc agaagcggtt ccccaagaag agcgcaaaga gcttgaagcc gctgtttgac    1380
gagctgattg cggcggcgtg a                                             1401
```

<210> SEQ ID NO 2

-continued

```
<211> LENGTH: 466
<212> TYPE: PRT
<213> ORGANISM: Trichoderma reesei

<400> SEQUENCE: 2

Met Leu Pro Lys Asp Phe Gln Trp Gly Phe Ala Thr Ala Ala Tyr Gln
1               5                   10                  15

Ile Glu Gly Ala Val Asp Gln Asp Gly Arg Gly Pro Ser Ile Trp Asp
            20                  25                  30

Thr Phe Cys Ala Gln Pro Gly Lys Ile Ala Asp Gly Ser Ser Gly Val
        35                  40                  45

Thr Ala Cys Asp Ser Tyr Asn Arg Thr Ala Glu Asp Ile Ala Leu Leu
    50                  55                  60

Lys Ser Leu Gly Ala Lys Ser Tyr Arg Phe Ser Ile Ser Trp Ser Arg
65                  70                  75                  80

Ile Ile Pro Glu Gly Gly Arg Gly Asp Ala Val Asn Gln Ala Gly Ile
                85                  90                  95

Asp His Tyr Val Lys Phe Val Asp Asp Leu Leu Asp Ala Gly Ile Thr
            100                 105                 110

Pro Phe Ile Thr Leu Phe His Trp Asp Leu Pro Glu Gly Leu His Gln
        115                 120                 125

Arg Tyr Gly Gly Leu Leu Asn Arg Thr Glu Phe Pro Leu Asp Phe Glu
    130                 135                 140

Asn Tyr Ala Arg Val Met Phe Arg Ala Leu Pro Lys Val Arg Asn Trp
145                 150                 155                 160

Ile Thr Phe Asn Glu Pro Leu Cys Ser Ala Ile Pro Gly Tyr Gly Ser
                165                 170                 175

Gly Thr Phe Ala Pro Gly Arg Gln Ser Thr Ser Glu Pro Trp Thr Val
            180                 185                 190

Gly His Asn Ile Leu Val Ala His Gly Arg Ala Val Lys Ala Tyr Arg
        195                 200                 205

Asp Asp Phe Lys Pro Ala Ser Gly Asp Gly Gln Ile Gly Ile Val Leu
    210                 215                 220

Asn Gly Asp Phe Thr Tyr Pro Trp Asp Ala Ala Asp Pro Ala Asp Lys
225                 230                 235                 240

Glu Ala Ala Glu Arg Arg Leu Glu Phe Phe Thr Ala Trp Phe Ala Asp
                245                 250                 255

Pro Ile Tyr Leu Gly Asp Tyr Pro Ala Ser Met Arg Lys Gln Leu Gly
            260                 265                 270

Asp Arg Leu Pro Thr Phe Thr Pro Glu Glu Arg Ala Leu Val His Gly
        275                 280                 285

Ser Asn Asp Phe Tyr Gly Met Asn His Tyr Thr Ser Asn Tyr Ile Arg
    290                 295                 300

His Arg Ser Ser Pro Ala Ser Ala Asp Asp Thr Val Gly Asn Val Asp
305                 310                 315                 320

Val Leu Phe Thr Asn Lys Gln Gly Asn Cys Ile Gly Pro Glu Thr Gln
                325                 330                 335

Ser Pro Trp Leu Arg Pro Cys Ala Ala Gly Phe Arg Asp Phe Leu Val
            340                 345                 350

Trp Ile Ser Lys Arg Tyr Gly Tyr Pro Pro Ile Tyr Val Thr Glu Asn
        355                 360                 365

Gly Thr Ser Ile Lys Gly Glu Ser Asp Leu Pro Lys Glu Lys Ile Leu
    370                 375                 380

Glu Asp Asp Phe Arg Val Lys Tyr Tyr Asn Glu Tyr Ile Arg Ala Met
```

Val Thr Ala Val Glu Leu Asp Gly Val Asn Val Lys Gly Tyr Phe Ala
            405                 410                 415

Trp Ser Leu Met Asp Asn Phe Glu Trp Ala Asp Gly Tyr Val Thr Arg
            420                 425                 430

Phe Gly Val Thr Tyr Val Asp Tyr Glu Asn Gly Gln Lys Arg Phe Pro
            435                 440                 445

Lys Lys Ser Ala Lys Ser Leu Lys Pro Leu Phe Asp Glu Leu Ile Ala
    450                 455                 460

Ala Ala
465

<210> SEQ ID NO 3
<211> LENGTH: 5356
<212> TYPE: DNA
<213> ORGANISM: Artificial sequence
<220> FEATURE:
<223> OTHER INFORMATION: Invalidation cassette

<400> SEQUENCE: 3

| | | | | | |
|---|---|---|---|---|---|
| gtgaccgaac | agcagcagca | gcagcagcag | gtgccgacga | cgacggaggc | gaagcggagc | 60 |
| gccgcgctgc | gccagtcgtt | tggcgtgccc | tggttcgaga | cgctgattga | gggctcgcgc | 120 |
| ctgggcagca | tgcgccggag | ctacggggcg | cagcggtcgc | gcgacgggca | ggcgagcatc | 180 |
| gagtgggaga | ttgtcgagtt | ctcggacggc | ggcggggaga | tggacttggg | cgaggcggac | 240 |
| gacgcggcgc | tgcagcagct | gggcaagagg | aagcatcacg | aggtttgacc | ggggaggggg | 300 |
| ccaaatagct | ttgggtatta | cacacacacg | tgtgtgtgtg | tgtgtgagag | gtgcaagtga | 360 |
| ggtggcgagt | gagttgactg | agtaactgag | tggctgagtg | agcgagtgat | gtgtaacaac | 420 |
| aacagctgtc | ggaaaacaaa | aggggaaccg | atacgccgtt | cgtggttcag | gggtaatgtg | 480 |
| tgtgtctggc | atggttggcg | tggtccggtc | tgtatatgag | ctgtcgcttc | tgtatcgttt | 540 |
| gtcttcttgt | tgcaattctt | tttttttcttg | tcctcggtca | ggcgttgttg | tgcagacagt | 600 |
| ggttggggag | ggaggcggtt | gtctgtccac | cttgcacctt | tttcatcatt | ttgcctttag | 660 |
| gcgtaactcg | atagcagagg | ctatatagag | agatccagat | gggaatcgac | gcaaaacctt | 720 |
| ttggagtcac | cactcgggac | gcttgtgcct | ttcgtctttta | ttatgcataa | atgccacctc | 780 |
| cagccggcgt | gcagcgtata | cttgtacact | tcagacttgt | agtagtaggt | agtactgtat | 840 |
| gtgactaggt | actattcatc | cgcaaagtgt | tgtcaaggaa | catgcggctt | ataagagtag | 900 |
| cactcggctg | gaatatggcg | tttgatcctc | gcaatccaat | tcccctttgc | atgattacat | 960 |
| ggcaactgtc | ccacgtgctg | tctcggctga | atctatccgt | cggcttacca | gaaagaaacg | 1020 |
| aagccggaca | gaatagccag | atttccatac | cttcaactcc | tttgtttctg | tctcctattc | 1080 |
| ccgccattcc | ccgatgcctc | gaactactgg | cagcaaaaat | ctccccgtct | tctcaccttt | 1140 |
| cgaccactcc | tcctcctccg | atcctctctt | tcccctctca | acgtccctca | gcgtaccatc | 1200 |
| aaagtgataa | tcagcagcag | cagcggcagc | agctctttcg | gagtatcacc | gtgtcacacc | 1260 |
| ctctccccc | atcgccgggc | taagctgctt | ggagccgtcc | ggatcgcccg | cctccgcttc | 1320 |
| tccagcttcc | ccatttacgt | tgaggtgcgg | ctagccttgc | cttgtgactc | gccttttctg | 1380 |
| cttgtatcgg | ccagggggg | gtttggttag | gtggttggct | ggttggctgg | ttggttagga | 1440 |
| tactgtagaa | aagggatccg | agagctacct | tacatcaata | tggccagcac | ctcttcggcg | 1500 |
| atacatactc | gccaccccag | ccggggcgat | tgtgtgtact | aggtaggctc | gtactatacc | 1560 |

-continued

```
agcaggagag gtgctgcttg gcaatcgtgc tcagctgtta ggttgtactt gtatggtact    1620
tgtaaggtgg tcatgcagtt gctaaggtac ctagggaggg attcaacgag ccctgcttcc    1680
aatgtccatc tggataggat ggcggctggc ggggccgaag ctgggaactc gccaacagtc    1740
atatgtaata gctcaagttg atgataccgt tttgccagga ttaggatgcg agaagcagca    1800
tgaatgtcgc tcatccgatg ccgcatcacc gttgtgtcag aaacgaccaa gctaagcaac    1860
taaggtacct taccgtccac tatctcaggt aaccaggtac taccagctac cctacctgcc    1920
gtgcctacct gctttagtat taatctttcc acctccctcc tcaatcttct tttccctcct    1980
ctcctctttt ttttttcttc ctcctcttct tctccataac cattcctaac aacatcgaca    2040
ttctctccta atcaccagcc tcgcaaatcc tcaggttagt attactacta ctacaatcat    2100
caccacgatg ctccgcccga cgatgcggct tctgttcgcc tgcccctcct ctcactcgtg    2160
cccttgacga gctaccccgc cagactctcc tgcgtcacca atttttttcc ctatttaccc    2220
ctcctccctc tctccctctc gtttcttcct aacaaacaac caccaccaaa atctctttgg    2280
aagctcacga ctcacgcaag ctcaattcgc agatacaaat ctagaatgaa aaagcctgaa    2340
ctcaccgcga cgtctgtcga gaagtttctg atcgaaaagt tcgacagcgt ctccgacctg    2400
atgcagctct cggagggcga agaatctcgt gctttcagct tcgatgtagg agggcgtgga    2460
tatgtcctgc gggtaaatag ctgcgccgat ggtttctaca agatcgttat tgtttatcgg    2520
cactttgcat cggccgcgct cccgattccg gaagtgcttg acattgggga attcagcgag    2580
agcctgacct attgcatctc ccgccgtgca cagggtgtca cgttgcaaga cctgcctgaa    2640
accgaactgc ccgctgttct gcagccggtc gcggaggcca tggatgcgat cgctgcggcc    2700
gatcttagcc agacgagcgg gttcggccca ttcggaccgc aaggaatcgg tcaatacact    2760
acatggcgtg atttcatatg cgcgattgct gatccccatg tgtatcactg gcaaactgtg    2820
atggacgaca ccgtcagtgc gtccgtcgcg caggctctcg atgagctgat gctttgggcc    2880
gaggactgcc ccgaagtccg gcacctcgtg cacgcggatt tcggctccaa caatgtcctg    2940
acggacaatg gccgcataac agcggtcatt gactggagcg aggcgatgtt cggggattcc    3000
caatacgagg tcgccaacat cttcttctgg aggccgtggt tggcttgtat ggagcagcag    3060
acgcgctact tcgagcggag gcatccggag cttgcaggat cgccgcggct ccgggcgtat    3120
atgctccgca ttggtcttga ccaactctat cagagcttgg ttgacggcaa tttcgatgat    3180
gcagcttggg cgcagggtcg atgcgacgca atcgtccgat ccggagccgg gactgtcggg    3240
cgtacacaaa tcgcccgcag aagcgcggcc gtctggaccg atggctgtgt agaagtactc    3300
gccgatagtg gaaaccgacg ccccagcact cgtccgaggg caaaggaata atgcatgtgc    3360
tgtgttcctc agaatgggcc ccagaagggc gtcgagcatt gtctatgaat gcaaacaaaa    3420
atagtaaata aatagtaatt ctggccatga cgaatagagc caatctgctc cacttgacta    3480
tccttgtgac tgtatcgtat gtcgaaccct tgactgccca ttcaaacaat tgtaaaggaa    3540
tatgagctac aagttatgtc tcacgtttgc gtgcgagccc gtttgtacgt tattttgaga    3600
aagcgttgcc atcacatgct cacagtcact tggcttacga tcatgtttgc gatctttcgg    3660
taagaataca cagagtaacg attatacatc catcgctttc tatgattagg tactcagaca    3720
acacatggga aacaagataa ccatcgcatg caaggtcgat tccaatcatg atctggactg    3780
gggtattcca tctaagccat agtaccctcg agcccatcat cgtctgcgcc atggcgctca    3840
tggcggacgg gggcatggat gatggcatgg atgatggcat ggatgatggc atggacgatg    3900
gcatggacga tggctggggc ccgccaccgc ccttaacggg accgtagatg gcctcgtcgt    3960
```

```
cgctcgtgtc atctgtatca tcgtcgtcgt cttcgtcctt tttcgcttt gggtgcttcg      4020 cgcggagacg catattcttt gcgacttcgt ccgcgctgaa gccgtagatg ctcttgaggt      4080
agcgcatgaa ctcgaggtac gcatccgaca cgatttgcac atgcaagtgc gtcaactcga      4140
ccttggcatc ctcatccctc acgccctgct tcttcttctt ccttcttct cccacgttgg      4200 tgctgctgat gctccgattc tgggcgtcaa actcggccat ggccagcgcc gtctggcacg      4260
cgttgcgaat ctgccggccg ttccagcgca tgttttcgtg cttcttccag tatgcggtgg      4320
cgtacttgag aatgtccttt tcgtggatgt cgatttcgcg gcccttgtcg cggaagcgct      4380
gcttgatgat gcgcaggttg aggcggaaga tttcgcgcgt ggacgatttg tcaggggcg      4440 ggtagtagag ggagatgtgg atgcgggagg tgaaggcctc gtcaaagtcg ccgatgcggt      4500
tggtcgtgag gaagaggatg cctgcgtagt attcgaggac gcggaggaag acttgagttg      4560
acgagagttt agctgattct gagtaggggg tagcgcacag ataggggtaa aggggttgga      4620
ggtcaactta cctgctacga ggccgttgcg gacaaagttc ttgggggagc gctgggcgag      4680
aaagacgtct gcttcgtcga ggaggaggat gcagccccat cggttggcca ggctaaagtt      4740
tctctccagg gccgcttcta cttcactggc agttgcacca agatctcctg caaaggagt       4800 tgttgtgtac atgctttagc ctatatgaat cttgtagatt acttggacac aggaagtgac      4860
agtgcacata ccgcaggtga tttggaacaa aggcttgttg aagcgttcgg caacaccctc      4920
tataacatcc atgtcagcac atgtacgagg agggttggca tgattctctg aacttaccag      4980
cagttgttgt ctttcccacg cctggacttc catgtaacag aagaatgagg cccttccctg      5040
tataaagaag tcagttgatt cgcgctcaaa aagccttgtc aaaaggggga ataccttgc       5100 ctcgaataat gtccacctct tcattatcgc taaccctcgc ctccttgttc cgaaagtgct      5160
ggtcaaccaa acaatacaca atgtccttgt gctgcttcgg gagcaccagc tggtcaaacg      5220
ccgtctgctc ttttgagccc tcgctgacg gactgagata cttgagatcg agcttcgcta      5280
tccagcaagt cagcacacac actcttcaac gcagtaaaaa agagaagaaa aaggggggg       5340 gataagtgac gaaccc                                                     5356
```

<210> SEQ ID NO 4
<211> LENGTH: 1473
<212> TYPE: DNA
<213> ORGANISM: Artificial sequence
<220> FEATURE:
<223> OTHER INFORMATION: Sequence 5 upstream of the cella gene

<400> SEQUENCE: 4

```
acgatgatac cgacgccgcc gtgaccgaac agcagcagca gcagcagcag gtgccgacga       60
cgacggaggc gaagcggagc gccgcgctgc gccagtcgtt tggcgtgccc tggttcgaga      120
cgctgattga gggctcgcgc ctgggcagca tgcgccggag ctacggggcg cagcggtcgc      180
gcgacgggca ggcgagcatc gagtgggaga ttgtcgagtt ctcggacggc ggcggggaga      240
tggacttggg cgaggcggac gacgcggcgc tgcagcagct gggcaagagg aagcatcacg      300
aggtttgacc ggggagggg ccaaatagct ttgggtatta cacacacacg tgtgtgtgtg       360
tgtgtgagag gtgcaagtga ggtggcgagt gagttgactg agtaactgag tggctgagtg      420
agcgagtgat gtgtaacaac aacagctgtc ggaaaacaaa aggggaaccg atacgccgtt      480
cgtggttcag gggtaatgtg tgtgtctggc atggttggcg tggtccggtc tgtatatgag      540
ctgtcgcttc tgtatcgttt gtcttcttgt tgcaattctt ttttttcttg tcctcggtca      600
```

```
ggcgttgttg tgcagacagt ggttggggag ggaggcggtt gtctgtccac cttgcacctt      660
tttcatcatt ttgcctttag gcgtaactcg atagcagagg ctatatagag agatccagat      720
gggaatcgac gcaaaacctt ttggagtcac cactcgggac gcttgtgcct ttcgtcttta      780
ttatgcataa atgccacctc cagccggcgt gcagcgtata cttgtacact tcagacttgt      840
agtagtaggt agtactgtat gtgactaggt actattcatc cgcaaagtgt tgtcaaggaa      900
catgcggctt ataagagtag cactcggctg aatatggcg tttgatcctc gcaatccaat      960 tccccttttgc atgattacat ggcaactgtc ccacgtgctg tctcggctga atctatccgt     1020
cggcttacca gaaagaaacg aagccggaca gaatagccag atttccatac cttcaactcc     1080
tttgtttctg tctcctattc ccgccattcc ccgatgcctc gaactactgg cagcaaaaat     1140
ctccccgtct tctcaccttt cgaccactcc tcctcctccg atcctctctt tcccctctca     1200
acgtccctca gcgtaccatc aaagtgataa tcagcagcag cagcggcagc agctctttcg     1260
gagtatcacc gtgtcacacc ctctccccc atcgccgggc taagctgctt ggagccgtcc      1320
ggatcgcccg cctccgcttc tccagcttcc ccatttacgt tgaggtgcgg ctagccttgc     1380
cttgtgactc gccttttctg cttgtatcgg ccagggggg gtttggttag gtggttggct      1440
ggttggctgg ttggttagga tactgtagaa aag                                   1473

<210> SEQ ID NO 5
<211> LENGTH: 1565
<212> TYPE: DNA
<213> ORGANISM: Artificial sequence
<220> FEATURE:
<223> OTHER INFORMATION: Sequence 3 downstream of the cella gene

<400> SEQUENCE: 5
cccatcatcg tctgcgccat ggcgctcatg gcggacgggg gcatggatga tggcatggat       60
gatggcatgg atgatggcat ggacgatggc atggacgatg gctggggccc gccaccgccc      120
ttaacgggac cgtagatggc ctcgtcgtcg ctcgtgtcat ctgtatcatc gtcgtcgtct      180
tcgtcctttt tcgcttttgg gtgcttcgcg cggagacgca tattctttgc gacttcgtcc      240
gcgctgaagc cgtagatgct cttgaggtag cgcatgaact cgaggtacgc atccgacacg      300
atttgcacat gcaagtgcgt caactcgacc ttggcatcct catccctcac gccctgcttc      360
ttcttctttc cttcttctcc cacgttggtg ctgctgatgc tccgattctg ggcgtcaaac      420
tcggccatgg ccagcgccgt ctggcacgcg ttgcgaatct gccggccgtt ccagcgcatg      480
ttttcgtgct tcttccagta tgcggtggcg tacttgagaa tgtccttttc gtggatgtcg      540
atttcgcggc ccttgtcgcg gaagcgctgc ttgatgatgc gcaggttgag gcggaagatt      600
tcgcgcgtgg acgatttgtc gaggggcggg tagtagaggg agatgtggat gcgggaggtg      660
aaggcctcgt caaagtcgcc gatgcggttg gtcgtgagga agaggatgcc tgcgtagtat      720
tcgaggacgc ggaggaagac ttgagttgac gagagtttag ctgattctga gtagggggta      780
gcgcacagat aggggtaaag gggttggagg tcaacttacc tgctacgagg ccgttgcgga      840
caaagttctt gggggagcgc tgggcgagaa agacgtctgc ttcgtcgagg aggaggatgc      900
agccccatcg gttggccagg ctaaagtttc tctccagggc cgcttctact tcactggcag      960
ttgcaccaag atctcctgca aaaggagttg ttgtgtacat gctttagcct atatgaatct     1020
tgtagattac ttggacacag gaagtgacag tgcacatacc gcaggtgatt tggaacaaag     1080
gcttgttgaa gcgttcggca acaccctcta taacatccat gtcagcacat gtacgaggag     1140
ggttggcatg attctctgaa cttaccagca gttgttgtct ttcccacgcc tggacttcca     1200
```

```
tgtaacagaa gaatgaggcc cttccctgta taaagaagtc agttgattcg cgctcaaaaa    1260
gccttgtcaa aaggggaat acctttgcct cgaataatgt ccacctcttc attatcgcta     1320
accctcgcct ccttgttccg aaagtgctgg tcaaccaaac aatacacaat gtccttgtgc    1380
tgcttcggga gcaccagctg gtcaaacgcc gtctgctctt ttgagccctc gctgacggga    1440
ctgagatact tgagatcgag cttcgctatc cagcaagtca gcacacacac tcttcaacgc    1500
agtaaaaaag agaagaaaaa agggggggga taagtgacga accccattta cggctcctca    1560
acaca                                                                1565

<210> SEQ ID NO 6
<211> LENGTH: 2359
<212> TYPE: DNA
<213> ORGANISM: E.coli

<400> SEQUENCE: 6
ggatccgaga gctaccttac atcaatatgg ccagcacctc ttcggcgata catactcgcc      60
accccagccg gggcgattgt gtgtactagg taggctcgta ctataccagc aggagaggtg    120
ctgcttggca atcgtgctca gctgttaggt tgtacttgta tggtacttgt aaggtggtca    180
tgcagttgct aaggtaccta gggagggatt caacgagccc tgcttccaat gtccatctgg    240
ataggatggc ggctggcggg gccgaagctg ggaactcgcc aacagtcata tgtaatagct    300
caagttgatg ataccgtttt gccaggatta ggatgcgaga agcagcatga atgtcgctca    360
tccgatgccg catcaccgtt gtgtcagaaa cgaccaagct aagcaactaa ggtaccttac    420
cgtccactat ctcaggtaac caggtactac cagctaccct acctgccgtg cctacctgct    480
ttagtattaa tctttccacc tccctcctca atcttctttt ccctcctctc tcttttttt     540 tttcttcctc ctcttcttct ccataaccat tcctaacaac atcgacattc tctcctaatc    600
accagcctcg caaatcctca ggttagtatt actactacta caatcatcac cacgatgctc    660
cgcccgacga tgcggcttct gttcgcctgc ccctcctctc actcgtgccc ttgacgagct    720
accccgccag actctcctgc gtcaccaatt ttttttccta tttacccctc ctccctctct    780
ccctctcgtt tcttcctaac aaacaaccac caccaaaatc tctttggaag ctcacgactc    840
acgcaagctc aattcgcaga tacaaatcta gaatgaaaaa gcctgaactc accgcgacgt    900
ctgtcgagaa gtttctgatc gaaaagttcg acagcgtctc cgacctgatg cagctctcgg    960
agggcgaaga atctcgtgct ttcagcttcg atgtaggagg gcgtggatat gtcctgcggg   1020
taaatagctg cgccgatggt ttctacaaag atcgttatgt ttatcggcac tttgcatcgg   1080
ccgcgctccc gattccggaa gtgcttgaca ttggggaatt cagcgagagc ctgacctatt   1140
gcatctcccg ccgtgcacag ggtgtcacgt tgcaagacct gcctgaaacc gaactgcccg   1200
ctgttctgca gccggtcgcg gaggccatgg atgcgatcgc tgcggccgat cttagccaga   1260
cgagcgggtt cggcccattc ggaccgcaag gaatcggtca atacactaca tggcgtgatt   1320
tcatatgcgc gattgctgat ccccatgtgt atcactggca aactgtgatg gacgacaccg   1380
tcagtgcgtc cgtcgcgcag gctctcgatg agctgatgct ttgggccgag gactgccccg   1440
aagtccggca cctcgtgcac gcggatttcg gctccaacaa tgtcctgacg gacaatggcc   1500
gcataacagc ggtcattgac tggagcgagg cgatgttcgg ggattcccaa tacgaggtcg   1560
ccaacatctt cttctggagg ccgtggttgg cttgtatgga gcagcagacg cgctacttcg   1620
agcggaggca tccggagctt gcaggatcgc cgcggctccg ggcgtatatg ctccgcattg   1680
```

```
gtcttgacca actctatcag agcttggttg acggcaattt cgatgatgca gcttgggcgc      1740
agggtcgatg cgacgcaatc gtccgatccg gagccgggac tgtcgggcgt acacaaatcg      1800
cccgcagaag cgcggccgtc tggaccgatg gctgtgtaga agtactcgcc gatagtggaa      1860
accgacgccc cagcactcgt ccagggcaa  aggaataatg catgtgctgt gttcctcaga      1920
atgggcccca aagggcgtc  gagcattgtc tatgaatgca aacaaaaata gtaaataaat      1980
agtaattctg gccatgacga atagagccaa tctgctccac ttgactatcc ttgtgactgt      2040
atcgtatgtc gaaccttga  ctgcccattc aaacaattgt aaaggaatat gagctacaag      2100
ttatgtctca cgtttgcgtg cgagcccgtt tgtacgttat tttgagaaag cgttgccatc      2160
acatgctcac agtcacttgg cttacgatca tgtttgcgat ctttcggtaa gaatacacag      2220
agtaacgatt atacatccat cgctttctat gattaggtac tcagacaaca catgggaaac      2280
aagataacca tcgcatgcaa ggtcgattcc aatcatgatc tggactgggg tattccatct      2340
aagccatagt accctcgag                                                   2359
```

<210> SEQ ID NO 7
<211> LENGTH: 20
<212> TYPE: DNA
<213> ORGANISM: Artificial sequence
<220> FEATURE:
<223> OTHER INFORMATION: Primer

<400> SEQUENCE: 7

```
ggatccgaga gctaccttac                                                    20
```

<210> SEQ ID NO 8
<211> LENGTH: 20
<212> TYPE: DNA
<213> ORGANISM: Artificial sequence
<220> FEATURE:
<223> OTHER INFORMATION: Primer

<400> SEQUENCE: 8

```
ctcgagggta ctatggctta                                                    20
```

<210> SEQ ID NO 9
<211> LENGTH: 49
<212> TYPE: DNA
<213> ORGANISM: Artificial sequence
<220> FEATURE:
<223> OTHER INFORMATION: Primer

<400> SEQUENCE: 9

```
gtaacgccag ggttttccca gtcacgacga cgatgatacc gacgccgcc                    49
```

<210> SEQ ID NO 10
<211> LENGTH: 51
<212> TYPE: DNA
<213> ORGANISM: Artificial sequence
<220> FEATURE:
<223> OTHER INFORMATION: Primer

<400> SEQUENCE: 10

```
catattgatg taaggtagct ctcggatccc ttttctacag tatcctaacc a                 51
```

<210> SEQ ID NO 11
<211> LENGTH: 48
<212> TYPE: DNA
<213> ORGANISM: Artificial sequence
<220> FEATURE:
<223> OTHER INFORMATION: Primer

```
<400> SEQUENCE: 11
tattccatct aagccatagt accctcgagc ccatcatcgt ctgcgcca                48

<210> SEQ ID NO 12
<211> LENGTH: 50
<212> TYPE: DNA
<213> ORGANISM: Artificial sequence
<220> FEATURE:
<223> OTHER INFORMATION: Primer

<400> SEQUENCE: 12
gcggataaca atttcacaca ggaaacagct gtgttgagga gccgtaaatg              50

<210> SEQ ID NO 13
<211> LENGTH: 20
<212> TYPE: DNA
<213> ORGANISM: Artificial sequence
<220> FEATURE:
<223> OTHER INFORMATION: Primer

<400> SEQUENCE: 13
atcaccacga agctttgtct                                               20
```